United States Patent
Konishi et al.

(10) Patent No.: US 8,287,350 B2
(45) Date of Patent: Oct. 16, 2012

(54) GAME TERMINAL DEVICE, GAME MANAGEMENT SYSTEM AND GAME MANAGEMENT METHOD

(75) Inventors: Kazuma Konishi, Kobe (JP); Masakazu Shibamiya, Kobe (JP); Yasuyuki Nagatomo, Kobe (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 702 days.

(21) Appl. No.: 12/223,903

(22) PCT Filed: Feb. 7, 2007

(86) PCT No.: PCT/JP2007/052117
§ 371 (c)(1),
(2), (4) Date: Jun. 16, 2009

(87) PCT Pub. No.: WO2007/094215
PCT Pub. Date: Aug. 23, 2007

(65) Prior Publication Data
US 2010/0227678 A1  Sep. 9, 2010

(30) Foreign Application Priority Data

Feb. 16, 2006  (JP) ................................. 2006-038862

(51) Int. Cl.
*A63F 9/24* (2006.01)
*A63F 13/00* (2006.01)
*G06F 17/00* (2006.01)
*G06F 19/00* (2011.01)

(52) U.S. Cl. .......................................... 463/16; 463/42
(58) Field of Classification Search .................... 463/16, 463/17, 42
See application file for complete search history.

(56) References Cited

U.S. PATENT DOCUMENTS

| | | | |
|---|---|---|---|
| 6,848,997 B1 | 2/2005 | Hashimoto et al. | |
| 7,367,888 B1 * | 5/2008 | Chen et al. | 463/42 |
| 7,517,282 B1 * | 4/2009 | Pryor | 463/42 |
| 2002/0091833 A1 * | 7/2002 | Grimm et al. | 709/227 |
| 2003/0177347 A1 | 9/2003 | Schneider et al. | |
| 2004/0242321 A1 * | 12/2004 | Overton | 463/29 |
| 2007/0232396 A1 | 10/2007 | Yoo | |

FOREIGN PATENT DOCUMENTS

| | | |
|---|---|---|
| EP | 1 393 788 | 3/2004 |
| JP | 10-42062 | 2/1998 |
| JP | 2001-187273 | 7/2001 |
| JP | 2004-000680 | 1/2004 |
| JP | 2004-81671 | 3/2004 |
| JP | 2004-222805 | 8/2004 |
| JP | 2005-130166 | 5/2005 |
| TW | 237576 | 8/2005 |
| WO | WO-2005/111883 | 11/2005 |

* cited by examiner

*Primary Examiner* — David L Lewis
*Assistant Examiner* — Reginald Renwick
(74) *Attorney, Agent, or Firm* — Jordan and Hamburg LLP

(57) ABSTRACT

A game management method is for executing a competition game among a plurality of client terminal devices. Players are identified before the start of the game. If an occurrence of an unusual end of the game is judged during the game, it is judged whether or not the unusual end is an unauthorized end of the game due to an unauthorized operation by the player and it is judged whether or not a penalty is to be given to the player having ended the game in an unauthorized manner. By judging with high accuracy whether or not the unusual end of the game was caused by the unauthorized operation by the player, unauthorized operations of players are suppressed and fairness is better maintained among honest players.

21 Claims, 21 Drawing Sheets

GAME TERMINAL DEVICE, GAME MANAGEMENT SYSTEM AND GAME MANAGEMENT METHOD

FIELD OF TECHNOLOGY

The present invention relates to a game terminal device, a game management system and a game management method capable of executing a competition game by exchanging operation information with each other via a network.

BACKGROUND TECHNOLOGY

In recent years, competition games have been made playable among a plurality of shops via a network. In game terminal devices of this type, game results are collected by a central server, ranking in the entire country, area or shop is calculated based on the game results of players, the calculated ranking is displayed in the game devices at the end of the game or various awards (virtual honors, ranks, grades, etc.) determined in the game are given. Participation in the game is urged by displaying the ranking of top scorers and giving awards in this way.

A player tries to get a good game result in each game because he desires to be ranked high even in games. However, if such desire increases, there is a possibility of such a player psychology as not to leave a game result disadvantage to himself since his ranking may be lowered if the game ends when he loses ground while playing the game. As a result, the player may try to prevent the transmission of the game result to a central server before the game thought to end up with an unfavorable result is normally ended.

For example, it is thought to prevent the transmission of the game result to a host by turning a power switch of the game device off or shutting a network cable off to forcibly end (unusual end) the game during the game in the shop. In the case of such hindrance to the transmission of the game result to the central server, the ranking of the player having done such an action is hardly lowered in the end. Accordingly, the game result is not correctly reflected on the ranking, making a fair ranking process or its display impossible, wherefore the ranking becomes unfair to honest players.

There can be also thought a method for monitoring an occurrence of unusual end and preventing the participation of a player having done many unusual ends in the game assuming that he is conducting an unauthorized operation. However, there is a certain limit in relating the number of unusual ends and true unauthorized operations.

DISCLOSURE OF THE INVENTION

In view of the above, an object of the present invention is to provide technology capable of suppressing cheating acts of players.

Another object of the present invention is to provide a game terminal device, a game management system and a game management method capable of highly accurately judging whether an unusual end of a game is caused by an unauthorized operation by a player or an unavoidable occurrence such as blackout or network failure to suppress unauthorized operations of players and to maintain fairness among honest players.

According to one aspect of the present invention, a game capable of executing a competition game among a plurality of game terminal devices by exchanging operation information with each other via a network, players are identified before the start of the game; it is judged whether or not the game in process has been ended in an unusual manner; it is judged whether or not the unusual end is an unauthorized end of the game due to an unauthorized operation by the player; and it is judged whether or not a specified penalty is to be given to the player having ended the game in an unauthorized manner.

In this way, unauthorized operations of players can be suppressed and fairness can be maintained among honest players.

These and other objects, features and advantages of the present invention will become more apparent from an embodiment described with reference to accompanying drawings.

BEST MODES FOR EMBODYING THE INVENTION

Figure 1:
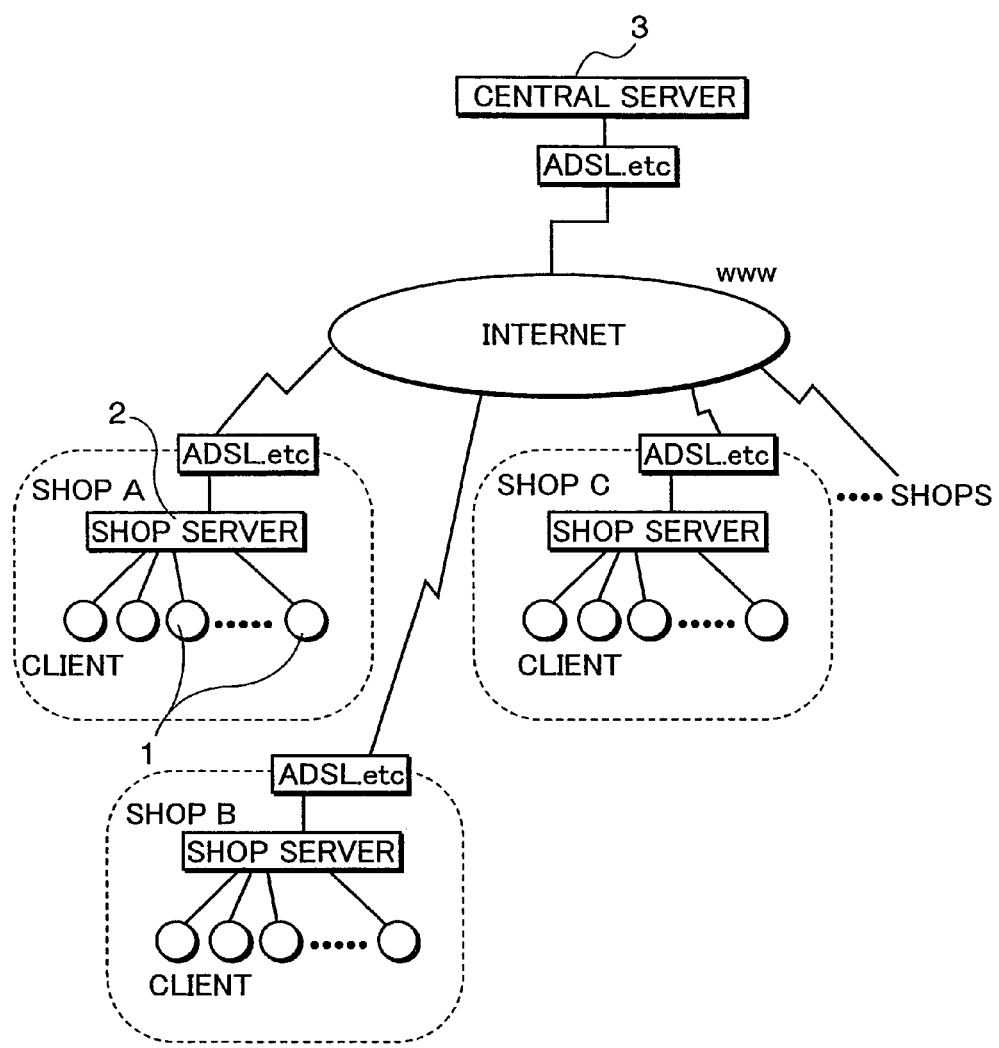
FIG. 1 is a construction diagram of a game system to which game servers according to the invention is applied.

FIG. 1 is a construction diagram of a game system to which game servers according to the present invention is applied.

The game system is provided with client terminal devices (game terminal devices) 1 assigned with corresponding identification information, a plurality of shop servers 2 each communicably connected with a plurality of (eight in this example) client terminal devices 1, and a central server 3 communicably connected with the plurality of shop servers 2 and managing a game played by a plurality of players using the client terminal devices 1.

Each client terminal device 1 proceeds with the game by a player performing specified operations in accordance with game screens displayed on a monitor. The identification information assigned in correspondence with each client terminal device 1 includes identification information of the corresponding shop server 2 connected with this client terminal device 1 (or identification information of a shop where this client terminal device 1 is installed), and identification information (referred to as a "terminal number") of this client terminal device 1 in the shop where this client terminal device 1 is installed. For example, if the identification information of the shop A is "A" and that of the client terminal device 1 in the shop A is "4", the identification information of this client terminal device 1 is "A4".

Each shop server 2 is communicably connected with a plurality of client terminal devices 1 and the central server 3, and transmits and receives data to and from the client terminal devices 1 and the central server 3.

The central server 3 is communicably connected with the plurality of shop servers 2, stores feature data of fingerprints of players necessary for fingerprint authentication to be described later adopted if necessary as player information in correspondence with user IDs, and selects players (referred to as competitors) to play the game in the same game space as the player by transmitting and receiving data to and from the client terminal devices 1 via the shop servers 2.

Figure 2:
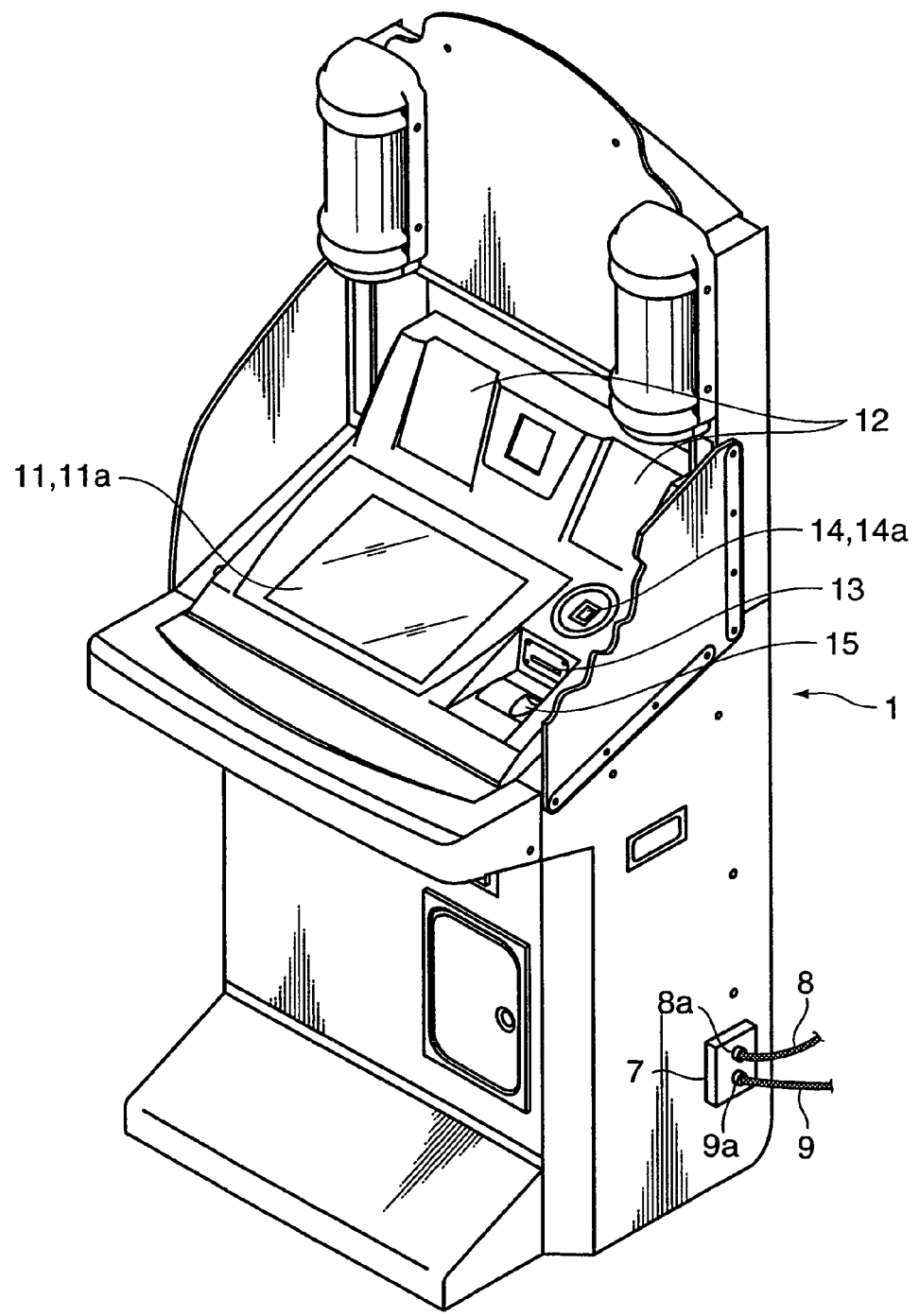
FIG. 2 is a perspective view showing the external appearance of one embodiment of a client terminal device.

FIG. 2 is a perspective view showing the external appearance of one embodiment of the client terminal device 1. Although a video game apparatus for business use integrally constructed with a monitor is described as one example of the client terminal device in the following description, the present invention is not particularly limited to this example and is similarly applicable to video game apparatuses for home use constructed by connecting video game machines for home use with home televisions, personal computers that function as video game apparatuses by executing a video game program, etc.

In this embodiment, competition games played using the client terminal devices 1 according to the present invention are mahjong games, wherein the player operating each client terminal device 1 competes with at least one of a player operating the other client terminal device 1 and a CPU player. In the case of competing with the player operating the other client terminal device 1, data are transmitted and received between the client terminal devices 1 via a network communicator 18 to be described later, the shop servers 2, the central server 3, etc.

Each client terminal device 1 is provided with a monitor 11 for displaying game screens, a touch panel 11a for judging which button has been pressed to instruct based on an address of a button displayed on a game screen of the monitor 11 to urge the selection or the like and a position pressed by the player, loudspeakers 12 for outputting sounds, a card reader 13 for reading information such as a user ID and the like stored in an individual card, a fingerprint authenticator 14 for extracting a feature data necessary for the authentication of an individual using fingerprint information from a CCD camera 14a, and a coin receiver 15 for receiving coins inserted by players. The feature data extracted by the fingerprint authenticator 14 is stored in a player information 362a of the central server 3 to be described later via the network communicator 18 to be described later, the shop server 2 and the like.

The monitor 11 is, for example, a thin liquid crystal display for displaying images.

The individual card is a magnetic card, an IC card or the like in which the individual information such as the user ID is stored. Although not shown, the card reader 13 is for enabling the readout of the individual information from the inserted individual card.

A control unit 16 (see FIG. 3) including a microcomputer for receiving detection signals from the respective parts and outputting control signals to the respective parts is provided at a specified position of the client terminal device 1.

Further, an outlet 7 is provided at a suitable position of the client terminal device 1, preferably at a position on a side surface or a rear surface difficult to see from a player playing the game, here at a bottom part of a side surface. A plug 8a of a communication cable 8 connected with the shop server 2 and a plug 9a of a power supply line 9 for supplying power to operate the client terminal device 1 are insertable into the outlet 7. External power supplied from the power supply line 9 is introduced to an unillustrated power supply circuit provided in the client terminal device 1, and currents of levels necessary for the respective parts are generated in this power supply circuit. The both plugs 8a, 9a of the communication cable 8 and the power supply line 9 may be inserted into separately prepared outlets. Further, a power supply switch may be used instead of the power supply plug.

Figure 3:
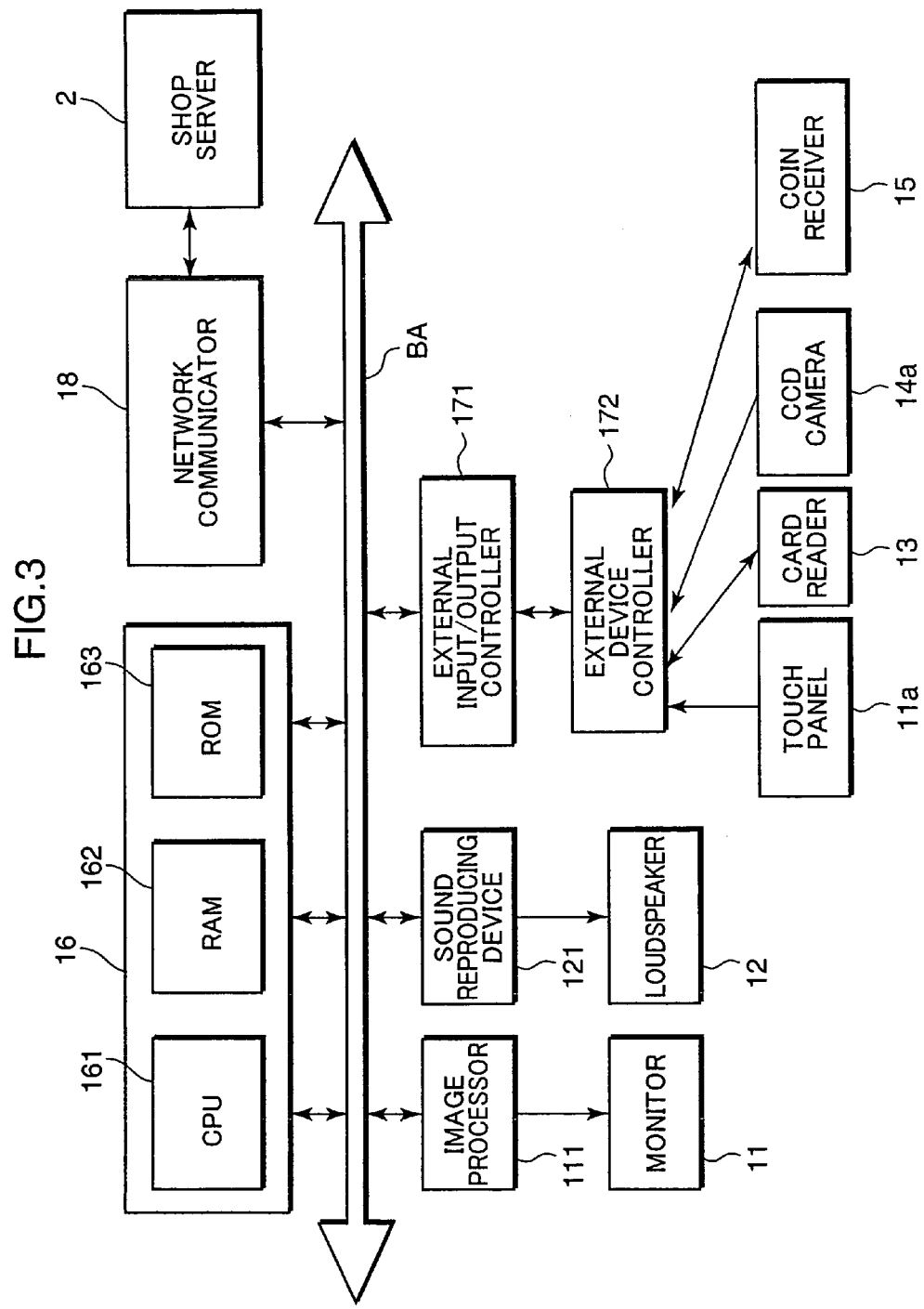
FIG. 3 is a hardware construction diagram showing one embodiment of the client terminal device.

FIG. 3 is a hardware construction diagram showing one embodiment of the client terminal device 1. The control unit 16 is for controlling the overall operation of the client terminal device 1, and includes an information processor (CPU) 161 for performing various information processes in addition to processes relating to the progress of the game in general and image display processes, a RAM 162 for temporarily saving information and the like obtained during processes, and a ROM 163 storing specified image information, a game program and the like to be described later.

An external input/output controller 171 converts the detection signals into digital signals to be used for the processes between the control unit 16 and detectors including the card reader 13, the touch panel 11a, the CCD camera 14a, and the coin receiver 15, and outputs command information to the respective detectors after converting it into control signals. Such signal processing and input/output processing are carried out, for example, in a time-sharing manner. An external device controller 172 outputs the control signals to the respective detectors and receives the detection signals from the respective detectors within the respective time-sharing periods.

An imaging processor 111 is for causing the monitor 11 to display a desired image in accordance with an image displaying instruction from the control unit 16 and includes a video RAM and the like. A sound reproducing device 121 is for outputting a specified message, a BGM or the like to the loudspeakers 12 in accordance with an instruction from the control unit 16.

Mahjong tile characters, background images, various screen images, data used for cheat judgment and the like are stored in the ROM 163. Each of the mahjong tile characters and the like is comprised of a necessary number of polygons so as to enable the three-dimensional imaging. The imaging processor 111 performs a calculation for the conversion from positions in a three-dimensional space to those in a simulated three-dimensional space, a light source calculation and other calculations in accordance with an imaging instruction from the CPU 161, and writes an image data to be imaged in the video RAM, for example, writes (adheres) texture data in (to) an area of the video RAM designated by polygons based on the calculation results.

Here, a relationship between the operation of the CPU 161 and that of the imaging processor 111 is described. The CPU 161 reads image data, sound data, control program data and game program data from the ROM 163 in accordance with an operating system (OS) stored in the ROM 163 which is built in or detachably mountable from the outside. Some or all of the read image data, sound data, control program data, etc. are saved in the RAM 162. Thereafter, the CPU 161 performs processes in accordance with the control program and various data (image data including polygons and textures of objects to be displayed and other character images, and sound data) saved in the RAM 162 and the detection signals and the like from the detectors.

Out of various data stored in the ROM 163, those that can be stored in a detachable storage medium may be made readable by a driver such as a hard disk drive, an optical disk drive, a flexible disk drive, a silicon disk drive, or a cassette medium reader. In such a case, the recording medium is, for example, a hard disk, an optical disk, a flexible disk, a CD, a DVD or a semiconductor memory.

The network communicator 18 is for transmitting and receiving operation information of the player and various pieces of event information to and from the central server 3 via the network, the shop server 2, etc.

Figure 4:
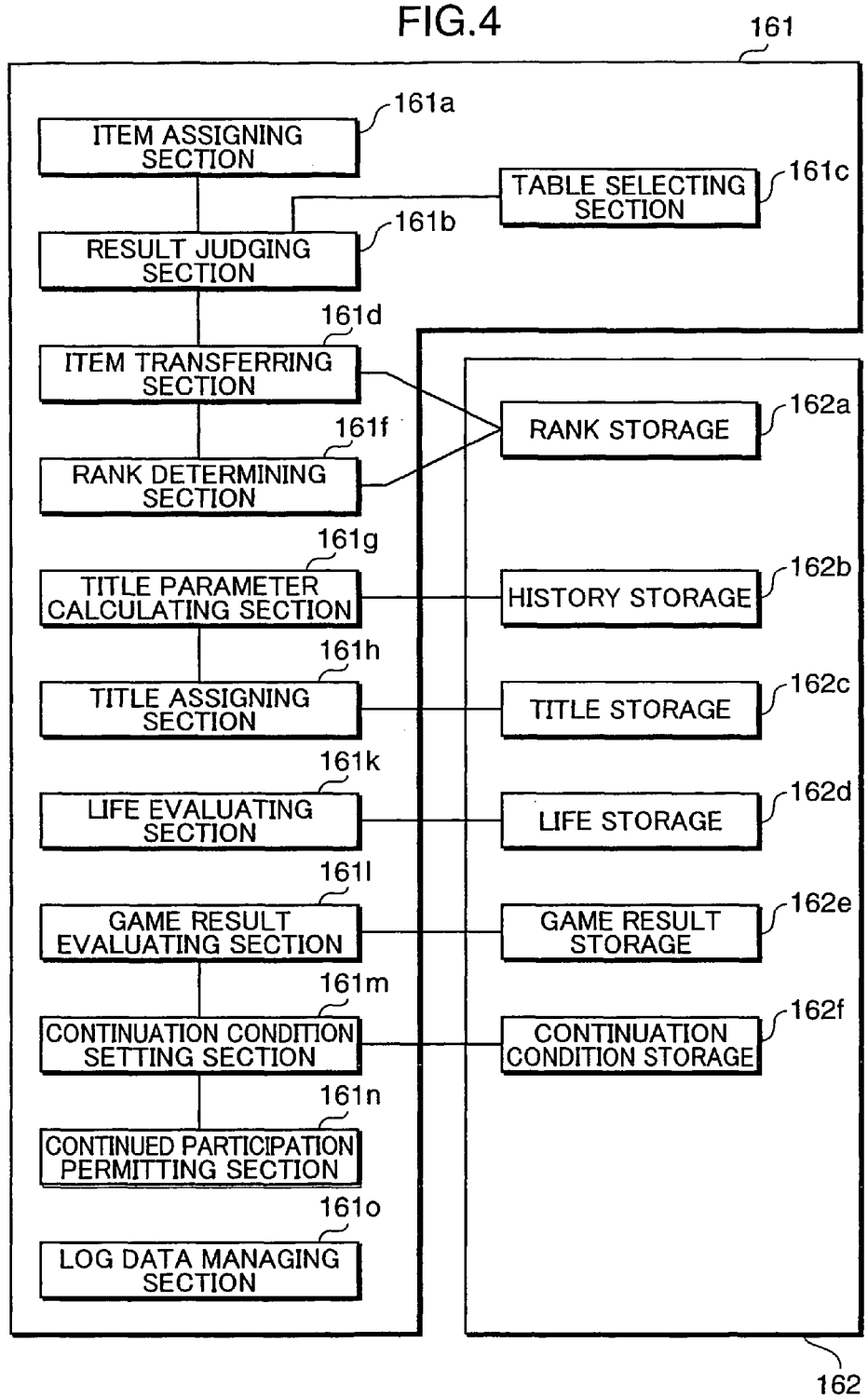
FIG. 4 is a functional construction diagram of a control unit of the client terminal device.

FIG. 4 is a functional construction diagram showing the control unit 16 of the client terminal device 1. The CPU 161 of the control unit 16 is provided with an item assigning section 161*a* for virtually assigning a specified number of items to a player satisfying a specific condition, a result judging section 161*b* for judging the ranking of the player in the game every time the game is ended, an item transferring section 161*d* for transferring a specified number of items virtually possessed by the player to other players based on the judgment result of the result judging section 161*b*, a rank determining section 161*f* for determining a rank (corresponding to a grade) representing the level of the player's strength in the game based on the number of the items the player virtually possesses, a title parameter calculating section 161*g* for calculating title parameters representing the feature of the player in the game based on a history data stored in a history storage 162*b* to be described later, a title assigning section 161*h* for assigning a title in the game to the player based on the calculated title parameters, a life evaluating section 161*k* for calculating a life as a judgment standard as to whether or not to continue to play and making a judgment, a game result evaluating section 161*l* for calculating a game result at the end of the game by evaluating the operation of the player during the game, a continuation condition setting section 161*m* for setting a continuation condition for the player to move onto the next game based on the game result of the player obtained by the game result evaluating section 161*l*, a continued participation permitting section 161*n* for permitting the participation in the next game on the continuation condition set by the continuation condition setting section 161*m* in response to a continued participation in the next game after the end of the game and a log data managing section 161*o* for obtaining a log data used to detect an unusual end and managing the log data.

The RAM 162 of the control unit 16 is provided with a rank storage 162*a* for storing the number of items and rank information in correspondence with the name of the player, the history storage 162*b* for storing past game history data and log data of the player for each player, a title storage 162*c* for storing a title assigned by the title assigning section 161*h* in correspondence with the name of the player, a life storage 162*d* for storing the value of the life calculated by the life evaluating section 161*k*, a game result storage 162*e* for storing the value of points of chips possessed by the player evaluated by the game result evaluating section 161*l*, and a continuation condition storage 162*f* for storing the continuation condition to continue to participate in the next game in correspondence with the value of points of chips possessed by the player (value of the game result). The RAM 162 is so configured as to prevent the erasure of data by a known backup power supply process even while the client terminal device 1 is turned off.

The item assigning section 161*a* virtually assigns items (here, items called "dragon chips") to a player satisfying the specified condition, increases or decreases points the player virtually possesses, and stores the item number and the points in the rank storage 162*a* in correspondence with the name of the player.

The result judging section 161*b* judges the ranking in the descending order of the points the players virtually possess in the form of chips when the game is ended. At the start of the game, all the players virtually possess the same points (initial points) in the form of chips. The initial points are, for example, 20000 points.

The item transferring section 161*d* is for transferring specified numbers of items among the players out of those virtually possessed by the players based on the judgment result of the result judging section 161*b* and the number of winds selected by a table selecting section 161*c* after the ranking was judged by the result judging section 161*b*.

The rank determining section 161*f* is for determining the rank representing the level of the player' strength in the game based on the number of the items the player virtually possesses, stores the rank in the rank storage 162*a* in correspondence with the name of the player, and transmits rank information to the central server 3 via the network communicator 18, the network, the shop server 2 and the like.

The title parameter calculating section 161*g* is for calculating the title parameters representing the feature of the player in the game based on the history data stored in the history storage 162*b* when the player is determined to obtain first dan in the determination of the rank by the rank determining section 161*f*. The parameters include a winning hand rate, a losing discard rate, an average lucky dragon "dora" number and an average hand point number.

(winning hand rate)=(cumulative winning hand number)/(cumulative played wind number)

(losing discard rate)=(cumulative losing discard number)/(cumulative played wind number)

(average lucky 'dora' number)=(cumulative lucky 'dora' number upon a winning hand)/(cumulative winning hand number)

(average hand point number)=(cumulative hand point number upon a winning hand)/(cumulative winning hand number)

It should be noted that the cumulative winning hand number, the cumulative losing discard number, the cumulative played wind number, the cumulative lucky 'dora' number upon a winning hand, the cumulative hand points upon a winning hand and the cumulative hand point number at a winning hand, and the cumulative winning hand number are stored in the history storage 162*b* in correspondence with the identification information of the player.

The title assigning section 161*h* is for virtually assigning the tile in the game to the player based on the title parameters calculated by the title parameter calculating section 161*g* when the player is determined to obtain first dan in the determination of the rank performed by the rank determining section 161, storing the title in the title storage 162*c* in correspondence with the name of the player, and transmitting the title information to the central server 3 via the network communicator 18, the network, the shop server 2 and the like.

The life evaluating section 161*k* is for increasing or decreasing the points of the life in accordance with a specified rule and judging whether or not the points of the life are equal to or below a specified value. Specifically, a life of 5000 HP (HP is a unit of the life) is virtually assigned to each player at the start of the game and is increased or decreased based on an increase or decrease of chips of the player. For example, if the chips of the player are decreased by 3000 points, the life is decreased by 3000 HP in proportion to the decrease of the chips. If the chips of the player are increased by 3000 (=3000×1), the life is increased by 2400 (=3000×0.8) in proportion to the increase of the chips. If the life falls to or below 0 HP during the competition, the player is urged to insert coins in the case of desiring to continue the competition in this embodiment. Whether or not the life is 5000 HP or more is checked at the end of the competition, and the player is urged to insert coins if the life is below 5000 HP and the player will continue to play. The life is initialized to 5000 HP at the start of the next game if the life is above 5000 HP at the end of the competition and the player will continue to play.

The game result evaluating section 161*l* is for calculating a game result at the end of the game by evaluating the operation of the player during the game in accordance with a specified rule. The game result represents an evaluation result on the operation of the player during the game. Specifically, the points of the chips possessed by each player that increases and decreases from the start to the end of the game are expressed as the game result after the end of the game.

The continuation condition setting section 161*m* is for setting the continuation condition of the player to move onto the next game based on the game result of the player calculated by the game result evaluating section 161*l*. The continuation condition of the player after the end of the game is set by referring to the continuation condition (number of coins to be added, etc.) for the continued participation corresponding to the game result of the player stored in the continuation condition storage 162*f*.

The continued participation permitting section 161*n* is for permitting the participation in the next game on the continuation condition set by the continuation condition setting section 161*m* in response to a received continued participation in the next game after the end of the game. The continued participation permitting section 161*n* also has a function of starting the next game without a specified condition to each player continues to participate if the game result was evaluated to be a high level by the game result evaluating section 161*l* upon starting the next game.

The rank storage 162*a* is for storing the number of items assigned by the item assigning section 161*a* and changed by the item transferring section 161*d* and the rank determined by the rank determining section 161*f* in correspondence with the name of player.

The history storage 162*b* is for storing the cumulative winning hand number that is the cumulative number of winning hands, the cumulative losing discard number that is the cumulative number of losing discards, the cumulative played wind number that is the cumulative number of winds played, the cumulative lucky 'dora' number that is the cumulative number of lucky 'dora's present in the hand upon a wining hand, the cumulative hand point number that is the cumulative number of hand points present in the hand upon a winning hand, the cumulative winning hand number that is the cumulative number of winning hands and the like as the past game history data of the player for each player. The history storage 162*b* also stores log data to be described in detail later.

The title storage 162*c* is for storing the values of the title parameters calculated by the title parameter calculating section 161*g*, the title assigned by the title assigning section 161*h* and the like.

The life storage 162*d* is for storing the value of the life calculated by the life evaluating section 161*k* in correspondence with the name of the player.

The game result storage 162*e* is for storing the value of points of the chips possessed by the player evaluated by the game result evaluating section 161*l* in correspondence with the name of the player.

The continuation condition storage 162*f* is for storing the continuation condition for the player to continue to participate in the next game in correspondence with the value of points of the chips possessed by the player (value of the game result) calculated by the game result evaluating section 161*l*.

Figure 5:
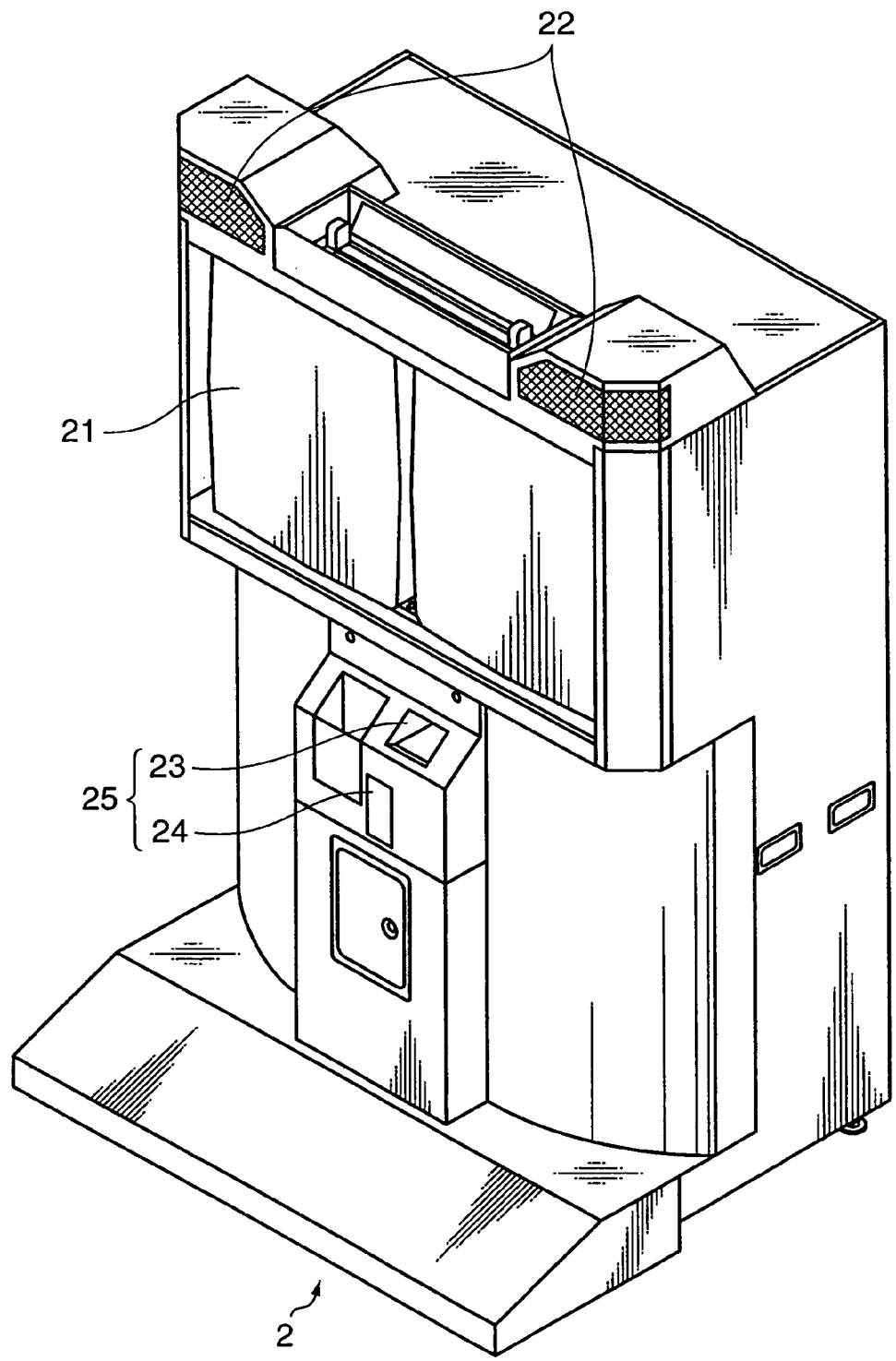
FIG. 5 is a perspective view showing the external appearance of one embodiment of a shop server.

FIG. 5 is a perspective view showing the external appearance of one embodiment of the shop server 2. The shop server 2 is provided with a monitor 21 for displaying game screens and the like, loudspeakers 22 for outputting sounds, and an individual card vending machine 25 for receiving coins inserted by players to sell individual cards.

The monitor 21 includes, for example, two CRTs for the purpose of displaying images in a large size. The two CRTs are arranged such that longer sides of substantially rectangular image display portions for displaying images are adjacent to each other, and an image signal is controlled to display one image on the two image displaying portions.

The loudspeakers 22 are for outputting specified messages and BGMs. The individual card vending machine 25 includes a coin receiver 24 for receiving coins inserted by a player and a card discharger 23 for discharging an individual card. The coin receiver 24 includes a coin discharge opening (not shown) for discharging the coin if the inserted coil is a false coin or the like.

A control unit 26 including a microcomputer for receiving detection signals from the respective parts and outputting control signals to the respective parts is arranged at a suitable position of the shop server 2.

Figure 6:
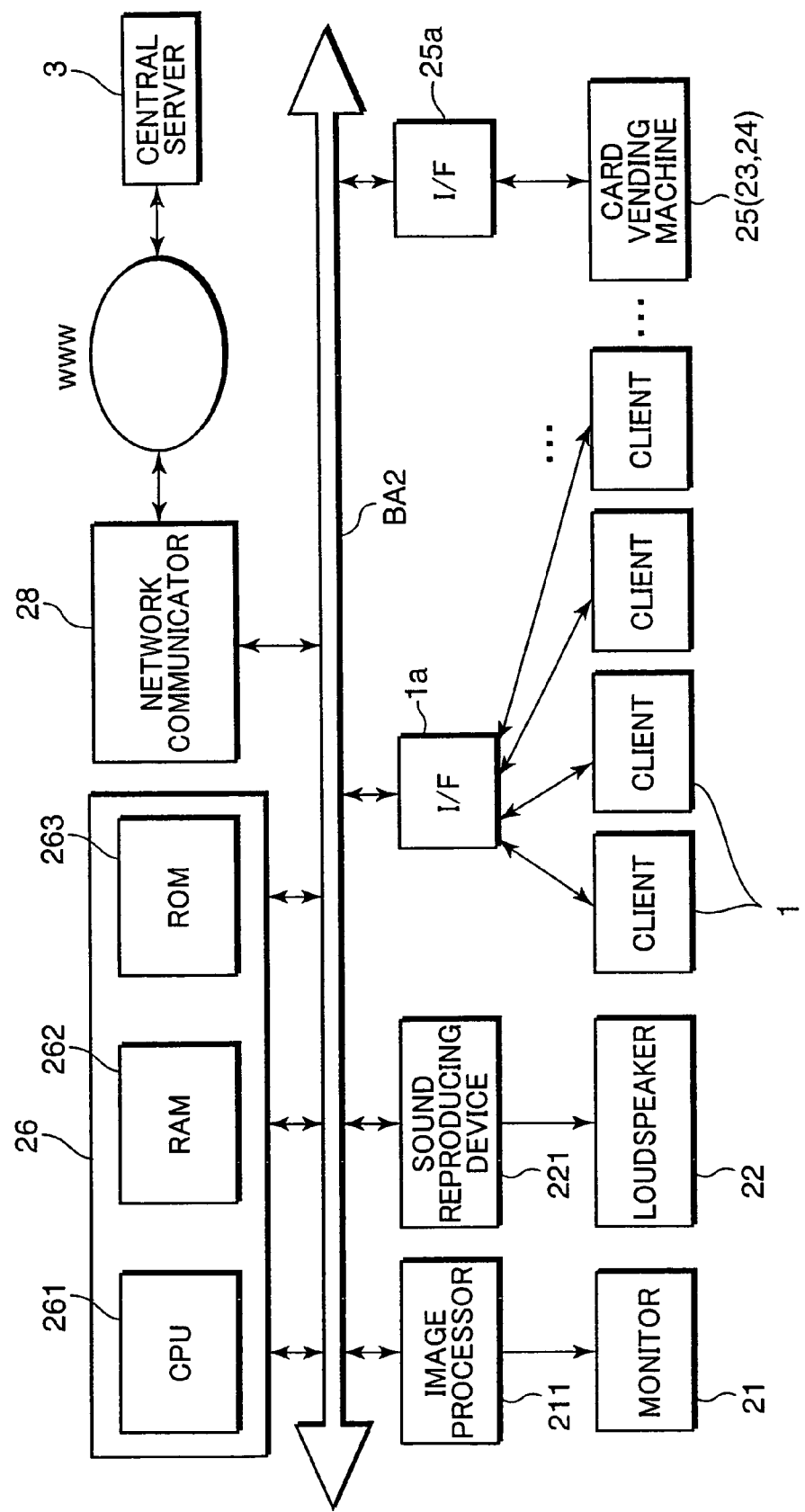
FIG. 6 is a hardware construction diagram showing one embodiment of the shop server.

FIG. 6 is a hardware construction diagram showing one embodiment of the shop server 2. The control unit 26 is for controlling the overall operation of the shop server 2 and includes an information processor (CPU) 261, a RAM 262 for temporarily saving information and the like obtained during processes, and a ROM 263 storing specified image information and the like.

An imaging processor 211 is for causing the monitor 21 to display a desired image in accordance with an image displaying instruction from the control unit 26 and includes a video RAM and the like. A sound reproducing device 221 is for outputting a specified message, a BGM or the like to the loudspeakers 22 in accordance with an instruction from the control unit 26.

Out of various data stored in the ROM 263, those that can be stored in a detachable storage medium may be made readable by a driver such as a hard disk drive, an optical disk drive, a flexible disk drive, a silicon disk drive, or a cassette medium reader. In such a case, the recording medium is, for example, a hard disk, an optical disk, a flexible disk, a CD, a DVD or a semiconductor memory.

The network communicator 28 is for transmitting and receiving various data to and from the central server 3 via the network such as WWW. An interface 1a is for transferring data among a plurality of (e.g. eight) client terminal devices 1 connected to the shop server 2.

The control unit 26 transmits information assigned with terminal identification information received from the central server 3 via the network communicator 28 to the client terminal device 1 corresponding to the terminal identification information via the interface 1a, and also transmits information assigned with the terminal identification information received from the client terminal device 1 to the central server 3 via the network communicator 28.

Figure 7:
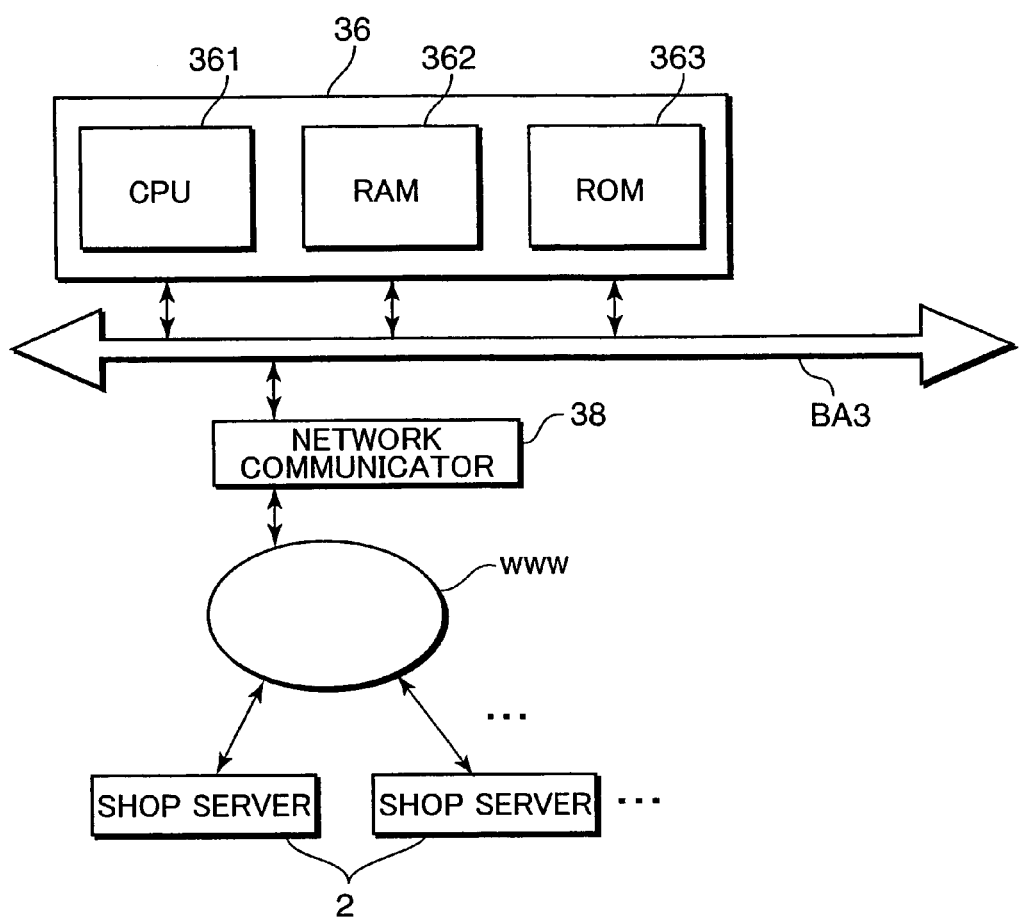
FIG. 7 is a hardware construction diagram showing one example of a central server according to the invention.

FIG. 7 is a hardware construction diagram showing one embodiment of the central server 3 according to the present invention. The control unit 36 is for controlling the overall operation of the central server 3 and includes an information processor (CPU) 361, a RAM 362 for temporarily saving information and the like obtained during processes, and a ROM 363 storing specified image information and the like.

Out of various data stored in the ROM 363, those that can be stored in a detachable storage medium may be made readable by a driver such as a hard disk drive, an optical disk drive, a flexible disk drive, a silicon disk drive, or a cassette medium reader. In such a case, the recording medium is, for example, a hard disk, an optical disk, a flexible disk, a CD, a DVD or a semiconductor memory.

The network communicator 38 is for transmitting and receiving various data to and from a plurality of shop servers 2 via the network such as WWW.

A game management program of the present invention is stored in the ROM 363, loaded into the RAM 362, and the game management program in the RAM 362 is successively executed by the CPU 361 to realize the respective functions.

Figure 8:
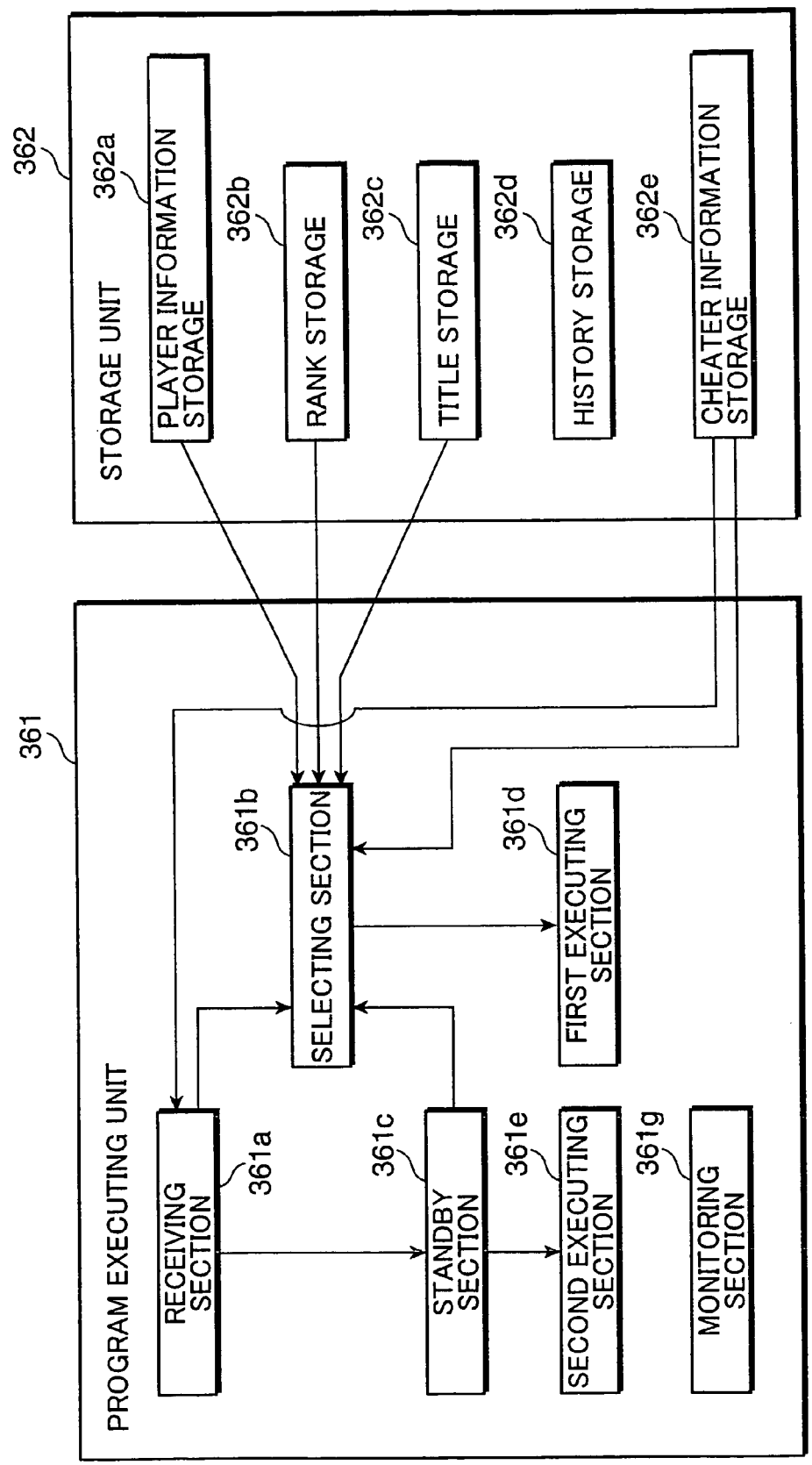
FIG. 8 is a functional construction diagram showing one example of a control unit of the central server.

FIG. 8 is a functional construction diagram showing the control unit 36 of the central server 3. The CPU 361 of the control unit 36 is provided with a receiving section 361a for receiving the participation of the player in the game when the game is started in each client terminal device 1, a selecting section 361b for selecting players, the number of whom is equal to or below a specified maximum number (here, 3) and equal to or above a specified number (here, 2) and who play in the same game space, from player(s) received by the receiving section 361a and player(s) kept in a standby state by a standby section 361c to be described later in accordance with a specified rule, the standby section 361c for keeping a player not selected by the selecting section 361b in a standby state and causing the selecting section 361b to select this player, a first executing section 361d for causing the players selected by the selecting section 361b to play the game in the same game space, a second executing section 361e for causing the player kept in the standby state by the standby section 361c to play the game in the same game space as a CPU player, and a monitoring section 361g for monitoring used states of all the client terminal devices 1 selected by the selecting section 361b and caused to execute the game by the first executing section 361d.

The RAM 362 is provided with the player information storage 362a for storing individual information such as user ID data and fingerprint feature data, a rank storage 362b for storing grade information representing the level of the player's strength in the game in relation to the identification information (user ID data) of the player, a title storage 362c for storing title information representing features of the player's strategy in the game in relation to the identification information of the player, a history storage 362d for storing a cumulative winning hand number, a cumulative losing discard number, a cumulative played wind number, a cumulative lucky 'dora' number upon a winning hand, a cumulative hand point number upon a winning hand, and the cumulative winning hand numbers and the like as the past game competition results of each player in relation to the identification information of the player, and a cheater information storage 362e for storing cheater information on the player having operated the client terminal device 1 when the game was forcibly ended as described later.

The receiving section 361a is for receiving the participation of the player in the game based on the player information stored in the player information storage 362a upon receiving the individual information of the player such as the user ID data and the fingerprint feature data transmitted from each client terminal device 1, and also receives the continued participation of the player in the game transmitted from each client terminal device 1.

The selecting section 361b is for selecting (combining) two or more, but three or less players to play the game in the same game space from the players received by the receiving section 361a and those kept in the standby state by the standby section 361c in accordance with a rule of the process, here based on the grades stored in the rank storage 362b and the titles stored in the title storage 362c. The selecting section 361b is also for selecting at least one more player if the number of the selected players is below (i.e. 2). Specifically, the player, whose grade (rank) is different from that of the already selected player by 2 levels or less, is selected. It should be noted that the titles may be included in selection conditions. In this embodiment, the selecting section 361a assigns selection numbers to the selected client terminal devices 1 in an order of selection.

The standby section 361c is for keeping the player in the standby state if he is not selected by the selecting section 361b and causing the selecting section 361b to select this player. The standby state is a state where the selection of a competitor by the selecting section 361b is waited.

The first executing section 361d causes the players selected by the selecting section 361b to play the game in the same game space, i.e. transmits an instruction information to the effect of executing the game among the players selected by the selecting section 361b as competitors (virtually sitting at the same table) to the client terminal devices 1 used by the players.

The second executing section 361e causes the player kept in the standby state by the standby section 361c to play the game in the same game space with the CPU player.

For example, the monitoring section 361g of the central server 3 calculates ranking in accordance with a specified rule considering the past rankings and the obtained points of the players having played the game in the competition mode, which are stored in the history storage 362d, and transmits the calculation result as overall ranking to the shop servers 2 and, if necessary to the client terminal devices 1, e.g. in a cycle to have it displayed. Upon this display, the ranks and titles are also displayed in correspondence with the ranking-displayed players.

Figure 9:
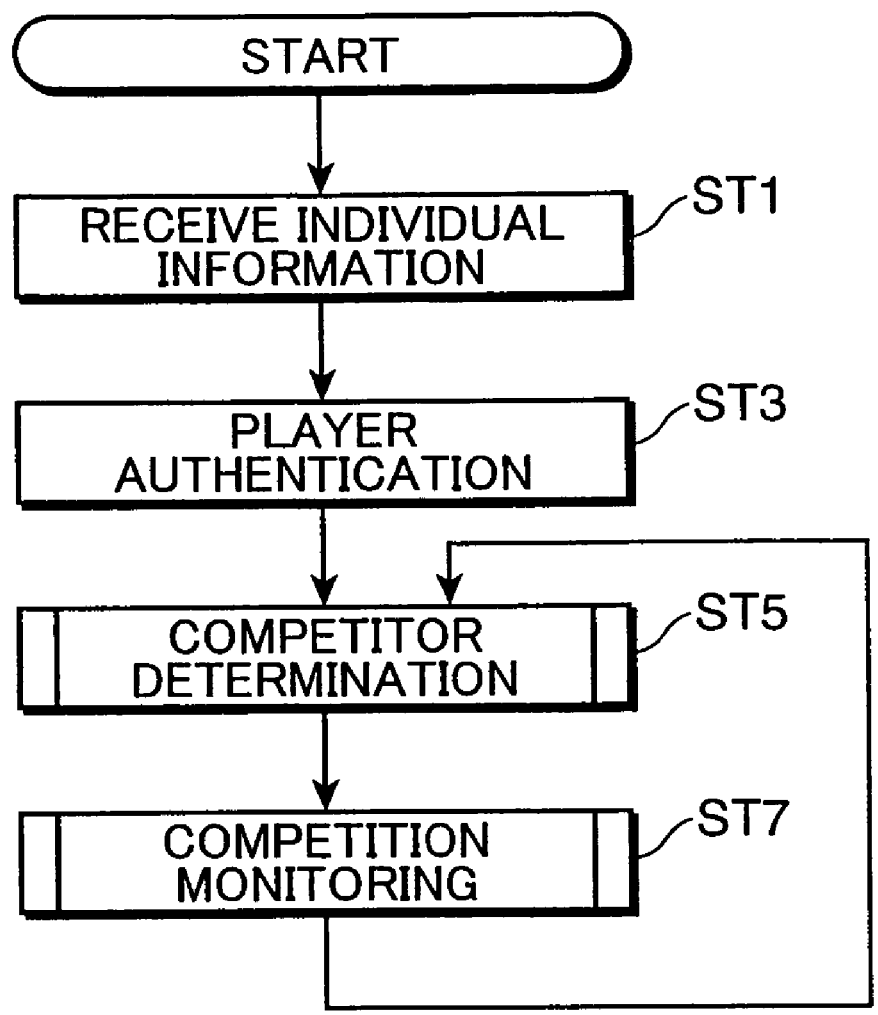
FIG. 9 is an exemplary flow chart showing the operation of the central server.

FIG. 9 is an exemplary flow chart showing the operation of the central server 3. First of all, the individual information transmitted from the client terminal devices 1 is received by the receiving section 361a (Step ST1). The players are authenticated based on the player information stored in the player information storage 362a and the participation of the players in the game is permitted if the authentication result is affirmative (Step ST3). Subsequently, out of the players whose participations were received by being permitted by the receiving section 361a (received not in the case of a "one-onone game" mode to be described later), two or more players who will play in the same space are selected based on the grades stored in the rank storage 362b and the titles stored in the title storage 363c by the selecting section 361b, and instruction information to the effect of causing the players selected by the selecting section 361b to play the game in the same game space is transmitted to the client terminal devices 1 used by the selected players by the first executing section 361d (Step ST5). Then, the used states of all the client terminal devices 1 caused to execute the game by the first executing section 361d are monitored by the monitoring section 361g (Step ST7).

Figure 10:
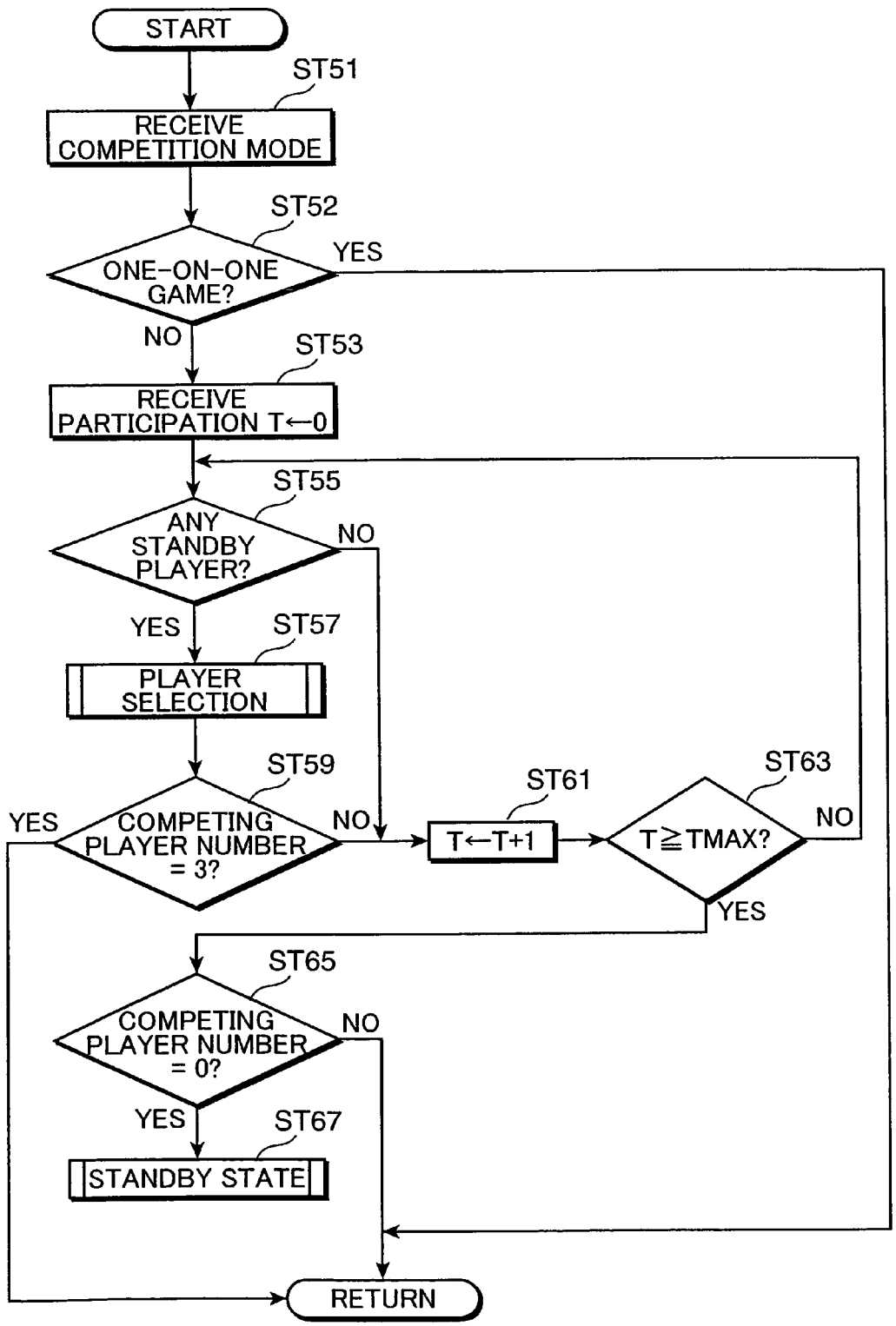
FIG. 10 is an exemplary detailed flow chart of Step ST5 (competitor determination process) shown in FIG. 9.

FIG. 10 is an exemplary detailed flow chart of Step ST5 (competitor determination process) shown in FIG. 9. The following process is performed by the selecting section 361b unless otherwise specified. First of all, a competition mode transmitted from the client terminal device 1 is received by the receiving section 361a (Step ST51). There are three modes of "one-on-one competition", "in-shop competition" and "communication competition". In the "one-on-one competition" mode, the player competes with a CPU player. In the "in-shop competition" mode, all the competitors are using the client terminal devices 1 connected to the same shop server 2. in the "communication competition" mode, at least one of the competitors is using the client terminal device 1 connected to a different shop server.

Subsequently, it is judged by the receiving section 361a whether or not the competition mode is the "one-on-one competition" mode (Step ST52). This process routine is returned if this judgment result is affirmative. If this judgment result is negative, the player is received, a time counter T is initialized to 0 (Step ST53) and instruction information is transmitted to the client terminal device 1 used by this player so that a standby screen shown in FIG. 11 is displayed.

Figure 11:
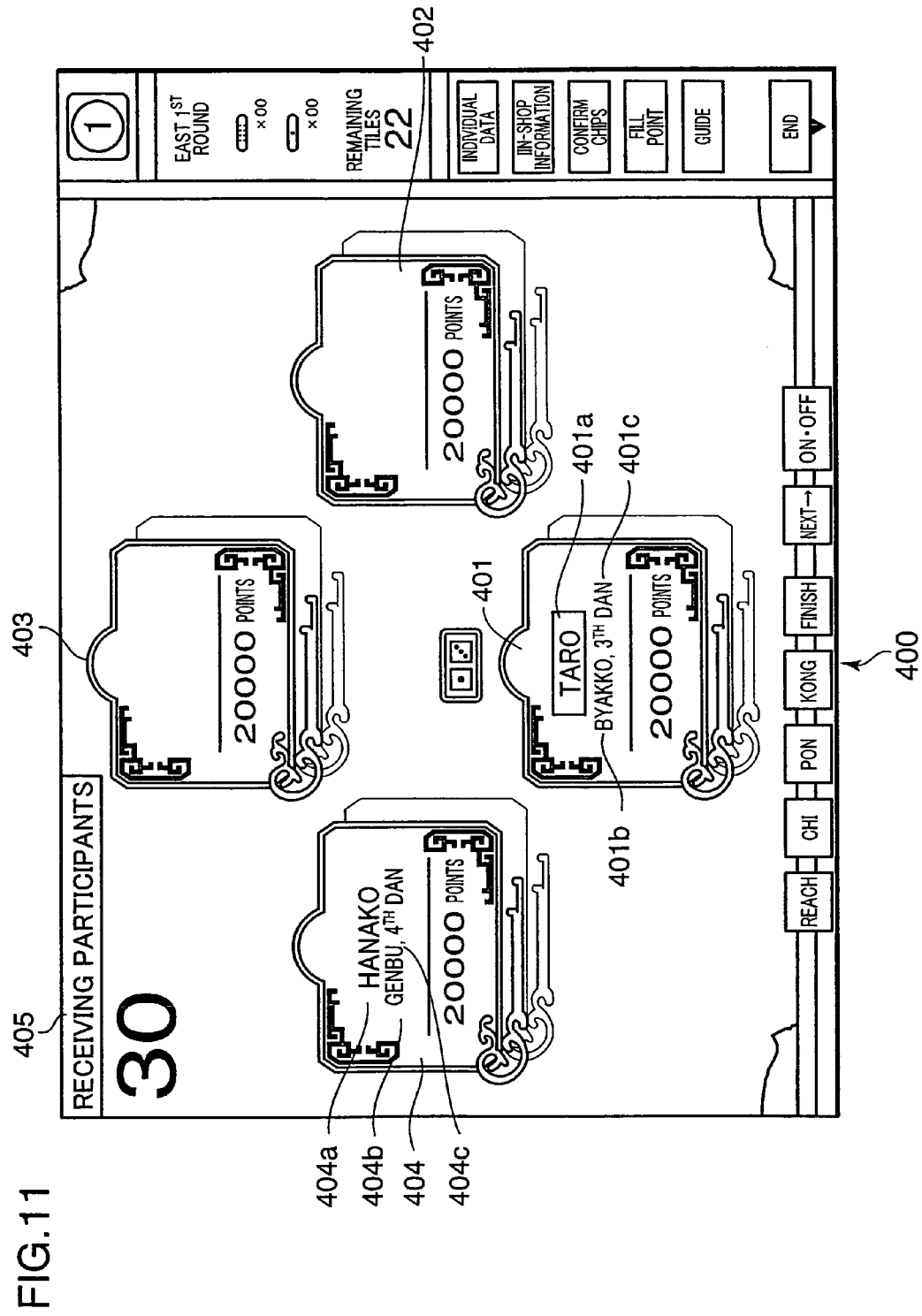
FIG. 11 is a diagram of an exemplary standby screen.

FIG. 11 is a diagram showing an exemplary standby screen. On a standby screen 400, player information 401 of the player where this screen is displayed is displayed at a lower side, pieces of player information 402, 403 indicating no selection of competitor are displayed at upper and right sides, and player information 404 of a CPU player is displayed at a left side. The pieces of player information 401, 404 displayed include names 401a, 404a as the names of the players in the game, titles 401b, 404b of the players and ranks 401c, 404c of the players. For example, the name of the CPU player is "Hanako", the title thereof is "Genbu" and the rank thereof is "4$^{th}$ dan". Since the pieces of player information 402, 403 of the competitors other than the player using the client terminal device 1 displaying the standby screen 400 and the CPU player are not displayed on the standby screen 400, this player can confirm that the competitors are not selected yet.

Referring back to FIG. 10, it is judged whether there are any players kept in the standby state by the standby section 361c or any already received players (Step ST55). This routine proceeds to Step ST61 if this judgment result is negative. If this judgment result is affirmative, two or more, but three or less players who will play in the same game are selected from the received players and those kept in the standby state by the standby section 361c based on the grades stored in the rank storage 362b and the titles stored in the title storage 363c (Step ST57) and instruction information is transmitted to the client terminal devices 1 used by these players so as to display a standby screen showing the selected result.

Figure 12:
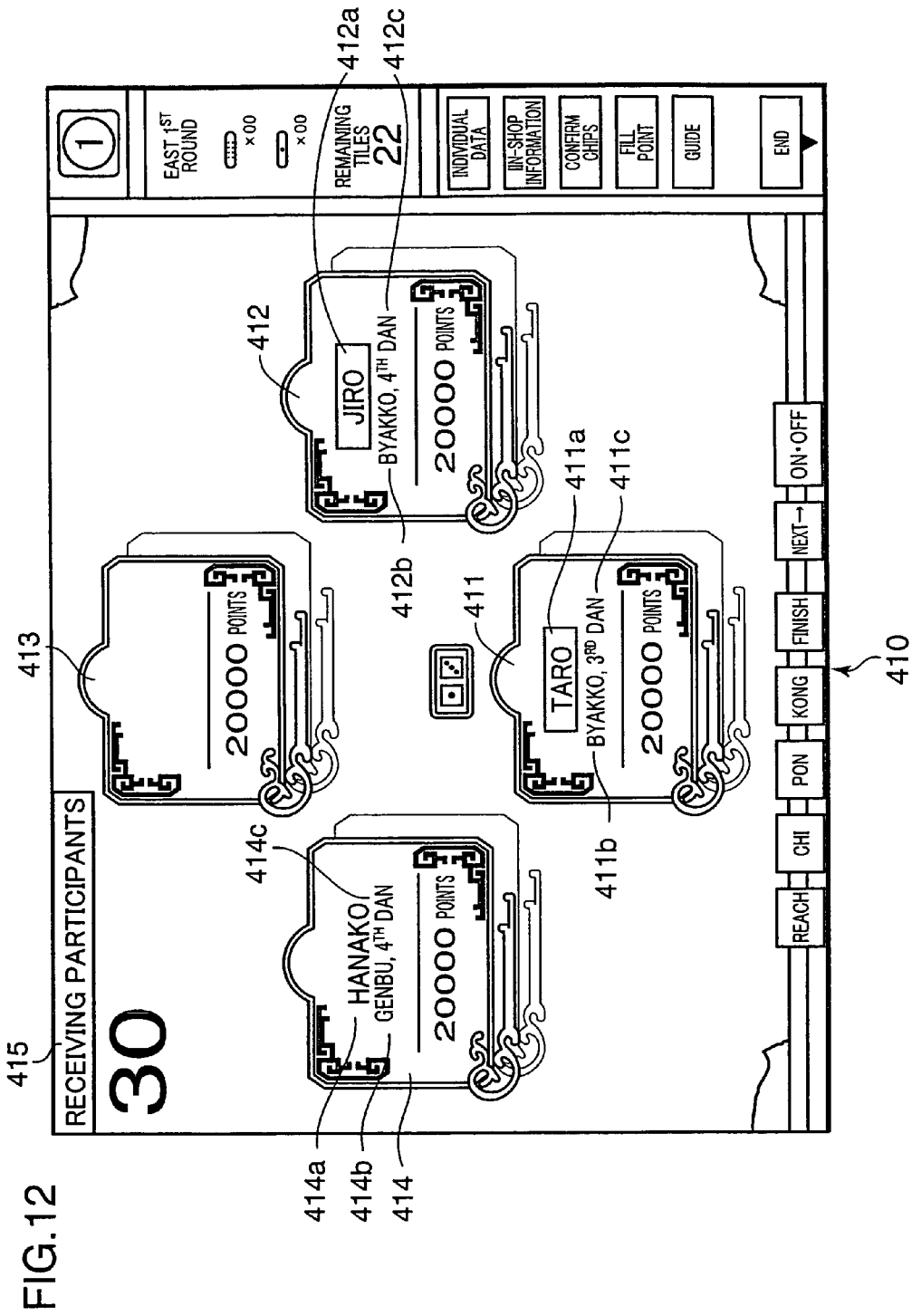
FIG. 12 is a diagram of an exemplary standby screen showing a selected result.

FIG. 12 is a diagram showing an exemplary standby screen showing a selected result. On a standby screen 410, player information 411 of a player where this screen is displayed is displayed at a lower side, player information 413 indicating no selection of competitor is displayed at an upper side, player information 414 of a CPU player is displayed at a left side and player information 412 of a player selected by the selecting section 361b is displayed at a right side. The pieces of player information 411, 412 and 414 displayed include names 411a, 412a and 414a as the names of the players in the game, titles 411b, 412b and 414b of the players and ranks 411c, 412c and 414c of the players. Since the player information 412 of the player (competitor) selected by the selecting section 361b is displayed in addition to those of the player using the client terminal device 1 displaying the screen and the CPU player, the player using the client terminal device 1 displaying this screen can confirm that one competitor has been selected.

Referring back to FIG. 10, it is judged whether or not the number of the selected players (number of the competitors) in Step ST57 is 3 (Step ST59). This process routine is returned if this judgment result is affirmative. If this judgment result is negative, the time counter T is incremented (Step ST61) and it is judged whether or not the value of the time counter T is a specified time TMAX (here, 30 sec.) (Step ST63). Step ST53 follows if this judgment is negative. If this judgment result is affirmative, it is judged whether or not the number of the players selected in Step ST57 is 0 (i.e. no player was selected) (Step ST65). If this judgment result is affirmative, players are kept in the standby state by the standby section 361c (Step ST67). If this judgment result is negative, this process routine is returned.

Figure 13:
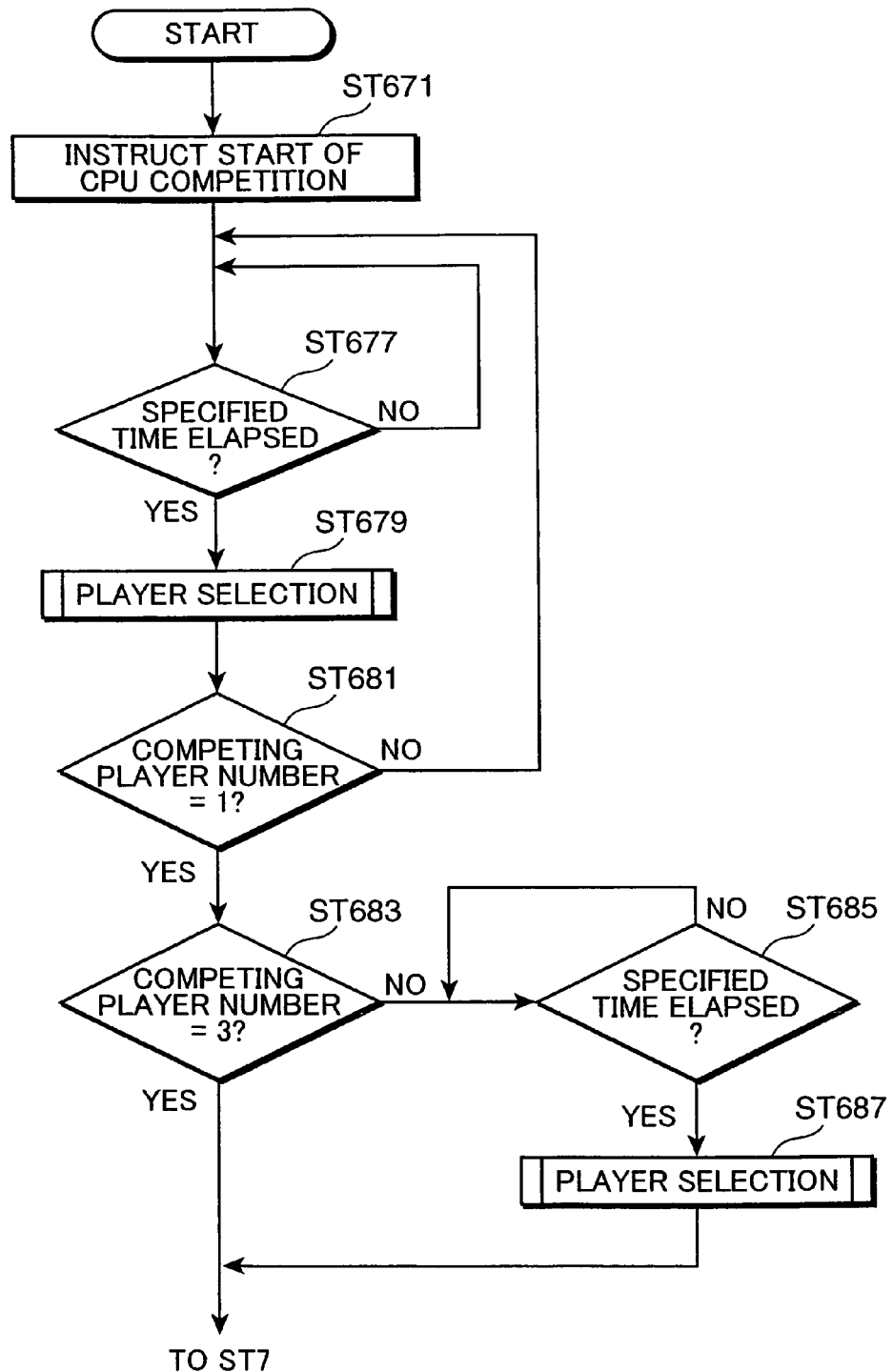
FIG. 13 is an exemplary detailed flow chart of a process (process in a standby state) in Step ST67 shown in FIG. 10.

FIG. 13 is an exemplary detailed flow chart of the process (process in the standby state) in Step ST67 shown in FIG. 10. The following process is performed by the standby section 361c unless otherwise specified. First of all, instruction information is transmitted to the client terminal devices 1 to start the CPU competition (competition only with the CPU player) (Step ST671).

It is judged whether or not a specified time (e.g. 30 sec.) has elapsed (Step St677), and elapsed time is counted up until this judgment result becomes affirmative. If this judgment result is affirmative, player selection is performed by the selecting section 361b (Step ST679) and it is judged whether or not a player in the standby state has been selected (Step ST681). If this judgment result is affirmative, Step ST683 is followed, in which instruction information is transmitted to the client terminal device 1 to display a competitor appearing screen showing the selection of the player. This routine returns to Step ST677 if this judgment result is negative.

If the judgment result in Step ST681 is affirmative, it is judged whether or not the number of the selected players is 3 (Step ST683). If this judgment result is affirmative, Step ST7 (competition monitoring process) of FIG. 9 follows. If this judgment result is negative (if one player was selected), it is judged whether or not a specified time (e.g. 10 sec.) has been elapsed (Step ST685) and elapsed time is counted up until this judgment result becomes affirmative. If this judgment result is affirmative, the player selection is performed by the selecting section 361b (Step ST687) and Step ST7 (competition monitoring process) of FIG. 9 follows.

Figure 14:
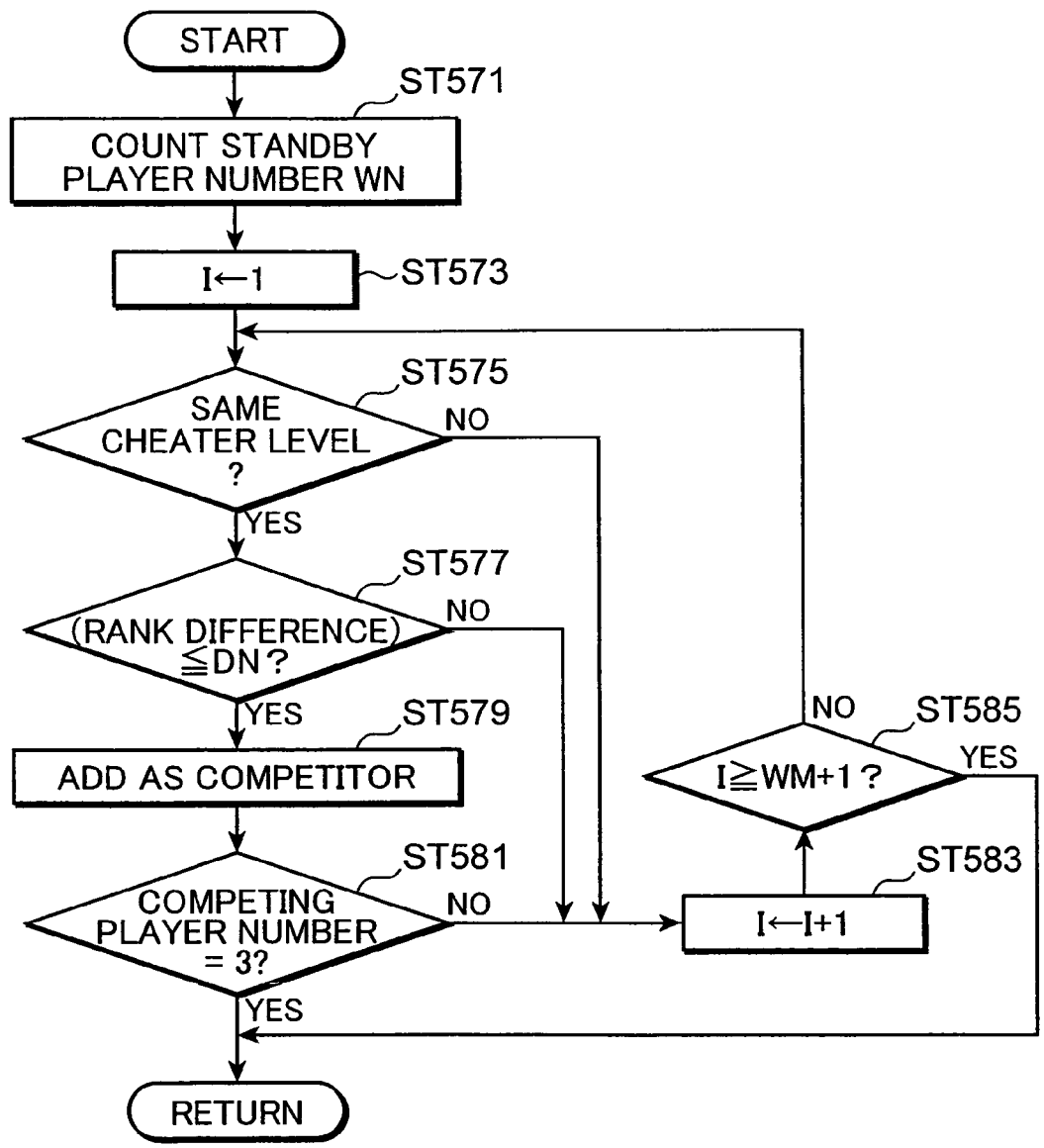
FIG. 14 is an exemplary detailed flow chart of a process (player selection process) in Step ST57 shown in FIG. 10.

FIG. 14 is an exemplary detailed flow chart of the process (player selection process) in Step ST57 shown in FIG. 10. It should be noted that the process in Step ST57 shown in FIG. 10 is the same process in Steps ST679 and ST687 shown in FIG. 13. The following process is entirely performed by the selecting section 361b. First of all, a total number WN of the player(s) in the standby state and the received player(s) is counted (Step ST571) and then a player number counter I is initialized (Step ST573). Then, it is judged whether or not later-described cheater levels of this player and the I$^{th}$ player are same based on information read from the cheater information storage 362e (Step ST575), and Step ST583 follows if this judgment result is negative. If this judgment result is affirmative, the ranks of this player and the I$^{th}$ player are read from the rank storage 362b and it is judged whether or not a rank difference is equal to or below a specified value DN (here, 2) (Step ST577). Step ST583 follows if this judgment result is negative. If this judgment result is affirmative, the I$^{th}$ player is added as a player to compete with this player (Step ST579).

Subsequently, it is judged whether or not the number of the players to compete with this player is 3 (Step ST581). This process routine is returned if this judgment result is affirmative. If this judgment result is negative or if the judgment result in Step S575 or ST577 is negative, the player number counter I is incremented (Step ST583) and it is judged whether or not the value of the player number counter I has exceeded the player total number WN (Step ST585). This process routine is returned if this judgment result is affirmative while being returned to Step ST575 if it is negative.

Figure 15:
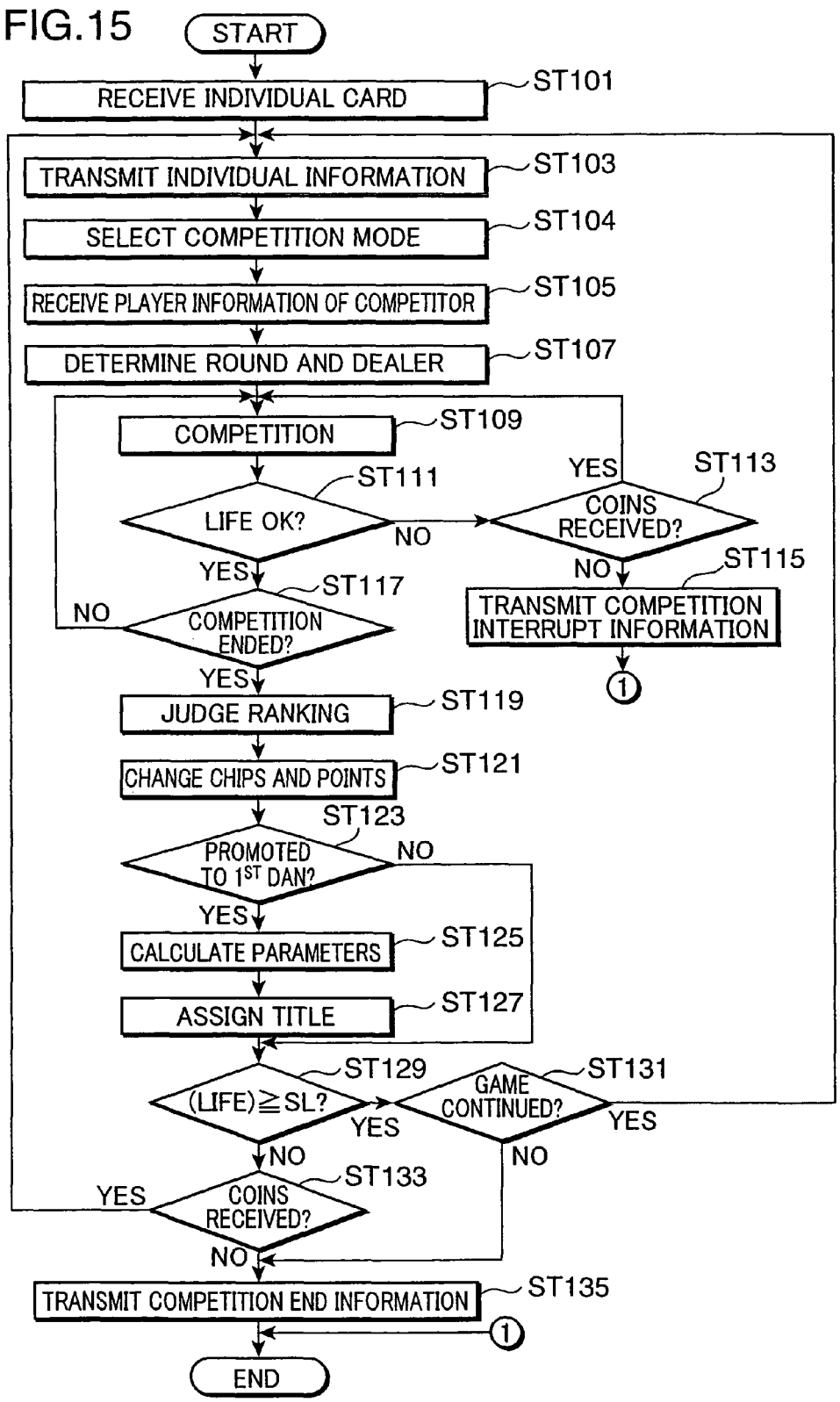
FIG. 15 is an exemplary flow chart showing the operation of the client terminal device.

Here, the operation of the client terminal device 1 performed based on instructions from the above central server 3 is described. FIG. 15 is an exemplary flow chart showing the operation of the client terminal device 1. First of all, a user ID of an individual card inserted into the card reader 13 is read, the fingerprint of the player is picked up by the CCD camera 14a of the fingerprint authenticator 14, and feature data necessary for individual authentication are extracted by the fingerprint authenticator 14 using fingerprint information from the CCD camera 14a (Step ST101). Then, the user ID data and the feature data are transmitted to the central server 3 (Step ST103). A mode selection screen used to select the competition mode is displayed and an input from the player is received to select the competition mode (Step ST104), and competition mode information is transmitted to the central server 3.

The names, ranks, titles, etc. of the other players (competitors) who will play the game in the same game space are received from the central server 3 (Step ST105). Subsequently, upon receiving instruction information to the effect of executing the game from the central server 3, the game is started and a round and a dealer are determined (Step ST107). Then, the competition is started (Step ST109) and a competition screen shown in FIG. 16 is displayed.

Figure 16:
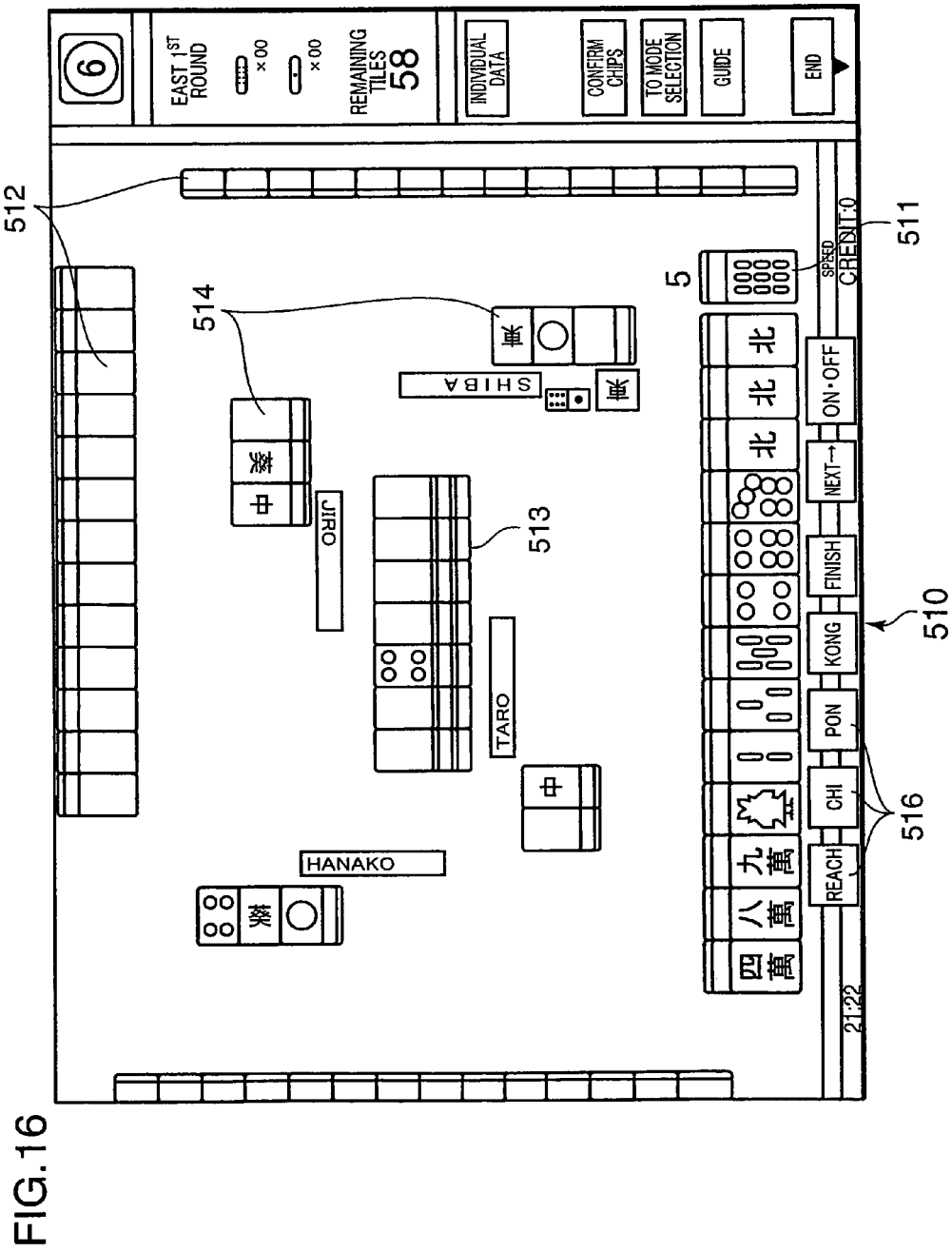
FIG. 16 is a diagram of an exemplary competition screen showing a status of competition.

FIG. 16 is a diagram showing an exemplary competition screen showing a status of competition. On a competition screen 510, hand tiles 511 of the player are so displayed at a lower side that the types of the tiles can be seen, hand tiles 512 of the competitors are so displayed at upper, left and right sides that the types of the tiles cannot be seen, a mountain wall 513 including lucky 'dora' displaying tiles is displayed substantially in the center with discarded tiles 514 displayed around the mountain wall 513, and various buttons 516 to be pressed down by the player are displayed at the bottom. The game proceeds by the player suitably pressing the buttons 516 down while seeing the competition screen 510.

Referring back to the flow chart of FIG. 15, when the competition is started, the life is calculated by the life calculating section 161k and it is judged whether or not the life exceeds 0 HP (1 HP or larger) (Step ST111). Step ST117 follows if this judgment result is affirmative. If this judgment result is negative, a continuation selection screen for urging the player to judge whether or not to continue the competition is displayed and the judgment of the player is received based on whether or not coins have been received by the coin receiver 15, thereby judging whether or not to continue the competition presently being executed (Step ST113). If this judgment result is negative, competition interrupt information to the effect of interrupting the competition is transmitted to the central server 3 (Step ST115) and this process is ended. This routine returns to Step ST109 if this judgment result is affirmative.

If the judgment result in Step ST111 is affirmative, it is judged whether or not the competition has been ended (Step ST117). Step ST109 follows if this judgment result is negative. If this judgment result is affirmative, competition end information indicating the end of the competition is transmitted to the central server 3 and the ranking in the game is judged by the result judging section 161b (Step ST119). Then, items virtually possessed by the player are transferred among the players by the item transferring section 161d based on the judgment result by the result judging section 161b and the number of rounds selected by the table selecting section 161c (Step ST121). Subsequently, the rank representing the player's strength in the game is determined by the rank determining section 161f based on the number of items and the points virtually possessed by the player and is compared with the rank thus far (at the end of the last game) stored in the rank storage 162a to judge whether or not to change the rank to the first dan (Step ST123). If the rank is not changed to the first dan, an unillustrated item displaying screen showing the number of presently possessed items is displaced and Step ST129 follows. The rank determined by the rank determining section 161f is stored in the rank storage 162a and transmitted as rank information to the central server 3.

If the rank is changed to the first dan, title parameters representing features of the player in the game are calculated by the title parameter calculating section 161g (Step ST125). Then, the title of the player in the game is virtually assigned to the player by the title assigning section 161h based on the title parameters calculated by the title parameter calculating section 161g (Step ST127) and are stored in the title storage 162c and transmitted as title information to the central server 3.

Subsequently, it is judged whether or not the present HP of the life is equal to or above a specified value SL (here, 5000 HP) necessary to continue to play the game (Step ST129). If this judgment result is affirmative, a continuation selection screen is displayed, an input from the player is received and it is judged whether or not the game is continued (Step ST131). This routine returns to Step ST103 if this judgment result is affirmative while proceeding to Step ST135 if it is negative.

If the judgment result in Step ST129 is negative, the continuation selection screen is displayed, the judgment of the player is received based on whether or not coins have been received by the coin receiver 15 and it is judged whether or not to continue the game (Step ST133). This routine returns to Step ST103 if this judgment result is affirmative while proceeding to Step ST135 if it is negative.

If the judgment result in Step ST133 or ST131 is negative, the competition end information indicating the end of the game is transmitted to the central server 3 (Step ST135) and this process is ended.

Figure 17:
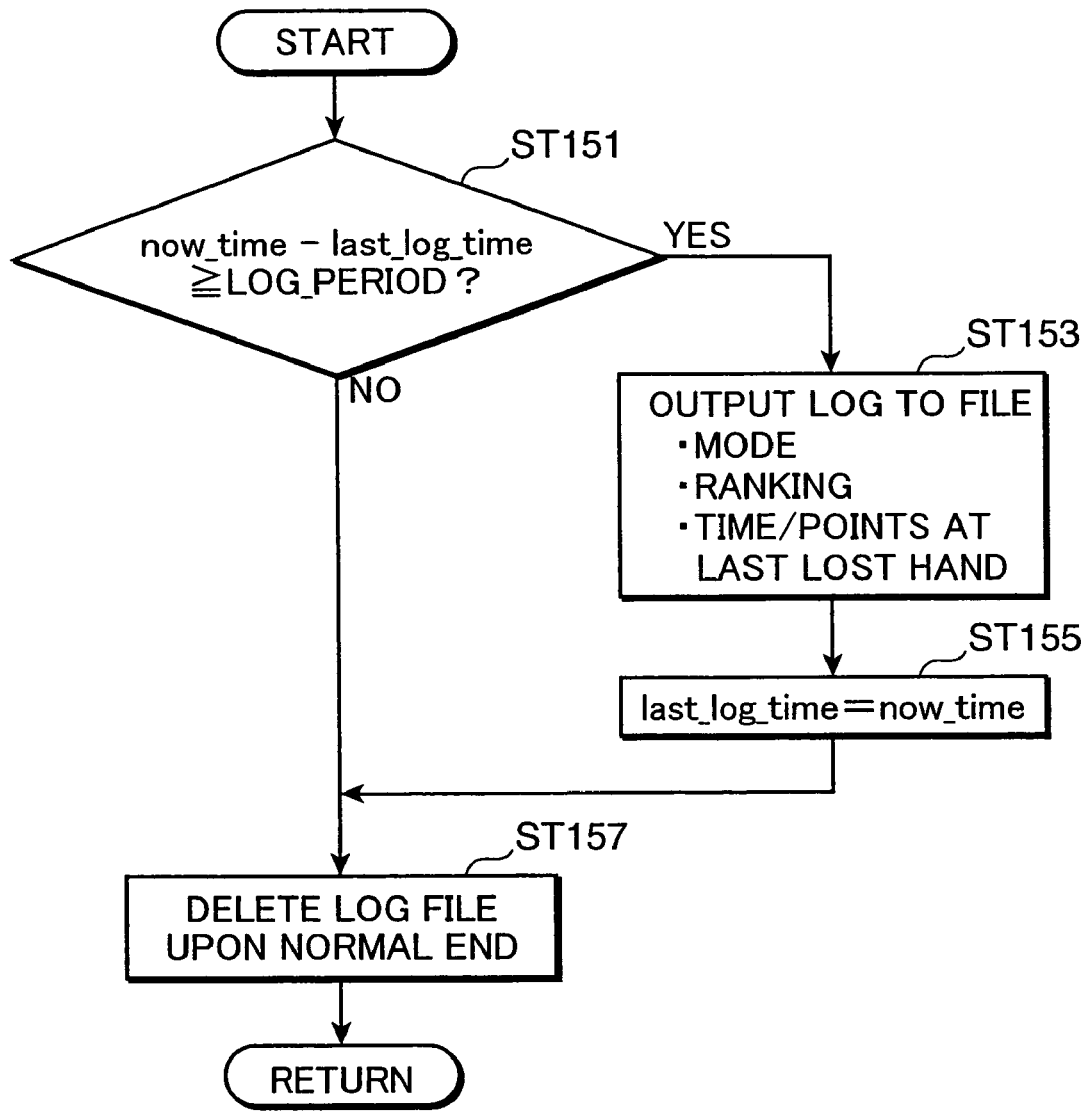
FIG. 17 is an exemplary flow chart of a process of obtaining unusual end information performed by a log managing section, which process is a part of a process performed in Step ST109 "Competition" of FIG. 15.

FIG. 17 is an exemplary flow chart of a process of obtaining information on an unusual end state, which process is a part of the process "Competition" in Step ST109 of FIG. 15 and performed by the log data managing section 161o.

The unusual end state here is referred to as a case where at least one of the communication cable 8 and the power supply line 9 of the client terminal device 1 operated by the player is pulled out from the outlet 7, a case where a temporary communication failure occurs between the client terminal device 1 and the client terminal device 1 of the competitor and operation or use information cannot be transmitted from this client terminal device 1 to the client terminal device 1 of the player and a case of momentary or temporary blackout (momentary stop) by unusual power supply condition. The information processor 161 performs the following process to continue the subsequent game upon the occurrence of the unusual end state. Specifically, in the case where the communication cable 8 of the client terminal device 1 operated by the player is pulled out from the outlet 7 by the player, information for the game progress cannot be transferred to and from the other client terminal devices 1 being competing. Thus, for example, the client terminal device 1 having the smallest selection number set during the above selection process out of the client terminal devices 1 being competing performs a process of newly setting a CPU player, and the other client terminal devices 1 having competed continue the game using simulated operation information by the CPU player for the continuation of the game. Further, similarly in the case where the power supply line 9 of the client terminal device 1 operated by the player is pulled out from the outlet 7 by the player, this client terminal device 1 does not operate. Thus, information for the game progress cannot be transferred to and from the other client terminal devices 1 being competing, the above process of newly setting a CPU player is performed, and the other client terminal devices 1 having competed continue the game using simulated operation information by the CPU player for the continuation of the game. In this case, since it is hard on honest players if the game is ended in failure, the game records corresponding to the client terminal devices 1 operated by the honest players are treated as the game results and accumulated in the central server 3.

In this embodiment, the unusual end state does not mean to forcibly end the game itself in the client terminal device being competing, but means to switch the client terminal device 1 where an unauthorized operation was conducted or an unusual condition occurred to a CPU player, i.e. means that the game is no longer a game played among the original competitors. Of course, the unusual end state may mean that the game itself is forcibly ended.

Referring back to FIG. 17, when the game is started, elapsed time is measured by a built-in timer, each client terminal device 1 constantly temporarily saves the respective game modes of "one-on-one competition", "in-shop competition" and "communication competition", ranking in the game, time and points when a losing discard was made out of the information concerning the operation of the player and the game statuses as log data in a specified area of the RAM 162. It is judged whether or not a log data leaving period (LOG PERIOD) has elapsed up to the present time after the saving of the latest log data (Step S151) and, if this judgment result is affirmative, the log data are stored in a log file, here, in the history storage 162b (Step S153). Subsequently, the present time is replaced as the last log time (Step ST155). On the other hand, if the game normally ends, the log file is deleted (Step ST157). Accordingly, if the game ends in an unusual end state, the game mode, the ranking, the time and points when the losing discard was made are present in correspondence with the authenticated player in the history storage 162b of the client terminal device 1 where unusual condition occurred.

Figure 18:
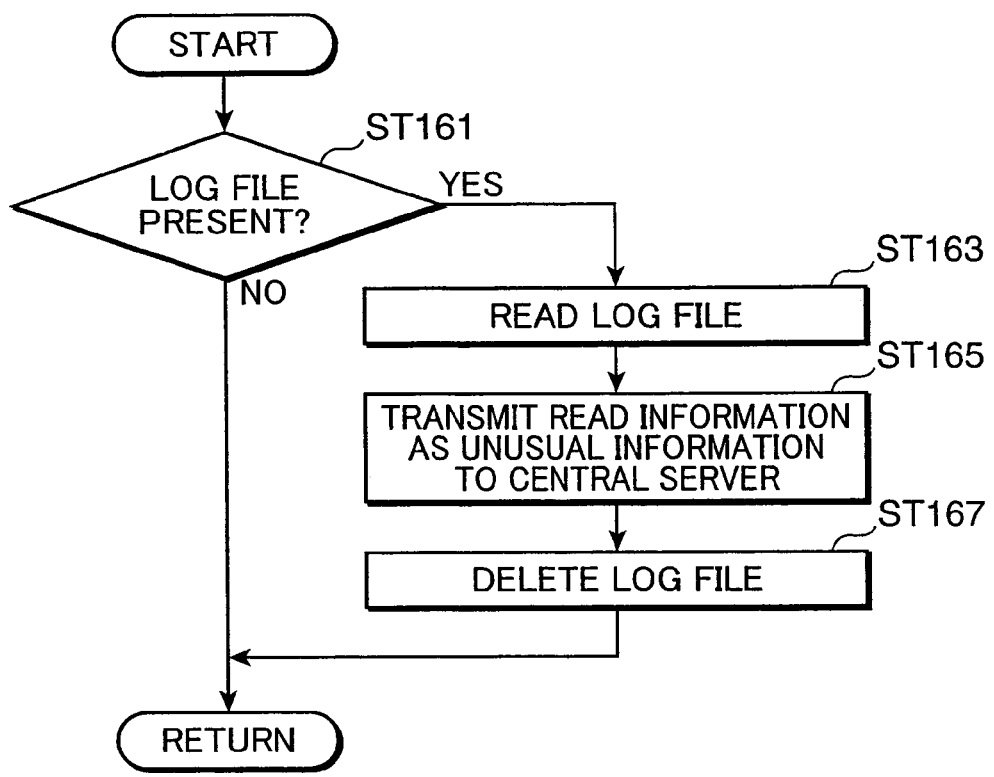
FIG. 18 is an exemplary flow chart of a log data processing performed by the log managing section, which processing is a part of a process at the time of starting the client terminal device.

FIG. 18 is an exemplary flow chart of a log data processing performed by the log data managing section 161o, which is a part of a process at the time of starting the client terminal device. If the player inserts the power supply line 9 into the outlet 7 after pulling it out from the outlet 7, the client terminal device is turned on again. After the client terminal device 1 is started, it is first judged whether or not any log data file is present in the history storage 162b (Step ST161). If the judgment result is negative, this routine returns, assuming that there was no unusual end. On the other hand, if this judgment result is affirmative, the log data file is read from the history storage 162b (Step ST163) and the read log data are transmitted to the central server 3 as unusual information (Step ST165). Thereafter, the log file is deleted (Step ST167). Also when the player inserts the communication cable 8 again after pulling it out from the outlet 7, the log data stored in the history storage 162b of this client terminal device are transmitted to the central server 3 after the communication is interrupted for a specified period.

Figure 19:
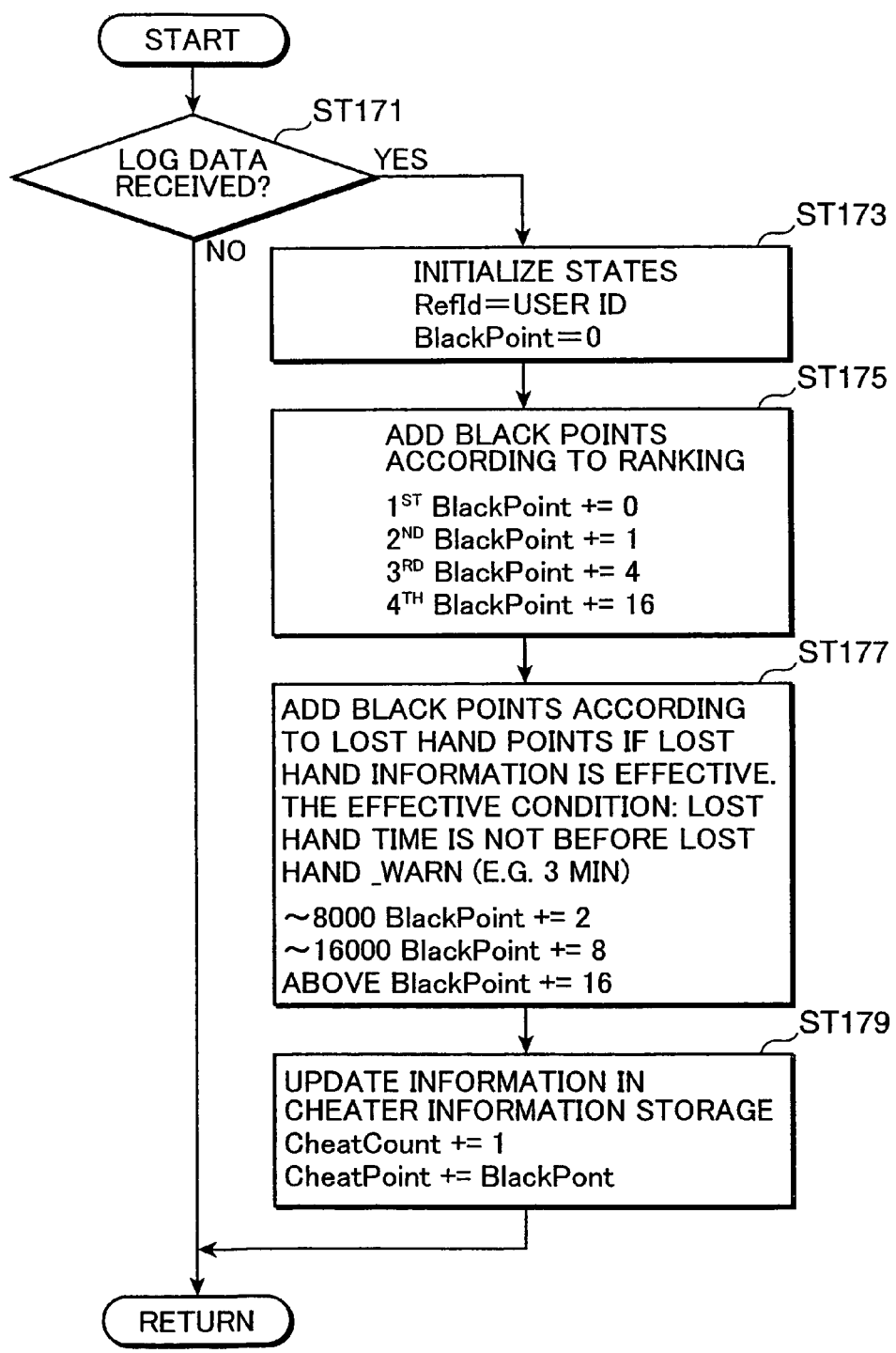
FIG. 19 is an exemplary flow chart of a process of importing a log file by the central server.

FIG. 19 is an exemplary flow chart of a log file importing process by the central server 3. In the central server 3, the monitoring section 361g judges whether or not the data being transmitted from the client terminal device includes any log data (Step ST171) and this routine returns if this judgment result is negative. On the other hand, if this judgment result is affirmative, the monitoring section 361g performs the following process. First of all, a cheat point (black point) file based on the player information is generated in a specified area of the RAM 362 (Step ST173). Subsequently, based on the received log data, cheat points weighted according to the ranking are set (Step ST175). Here, if the rank was in the first place, the cheat point is set to 0, assuming no intension of cheating (e.g. caused by communication failure or momentary stop). If the rank before the losing discard was in the second place, a cheat point is set to 1, assuming a small intension of cheating. If the rank before the losing discard was in the third place, cheat points of 4 are set, assuming a large intention of cheating. If the rank before the losing discard was in the fourth place (lowest rank), cheat points of 16 are set, assuming cheating (at least one of the communication cable 8 and the power supply line 9 was pulled out from the outlet 7). Weighting may not be necessary. For example, cheat points may be given only to the player in the lowest rank. Various weighting modes for the ranks can be thought. For example, cheat points may be set for inferior players (here, third and fourth places).

If the losing discard is effective, weighted cheat points are set (added) according the points when the losing discard was made (Step ST177). A condition for making the losing discard effective is, here, such that an unauthorized operation is performed within a specified period of, e.g. 3 min. after the losing discard was made. If the points when the losing discard was made were equal to or below 8000, cheat points of 2 are set, assuming a small intention of cheating and added to the points given in Step ST175. If the points when the losing discard was made were from 8000 to 16000, cheat points of 8 are set, assuming a large intention of cheating and added to the points given in Step ST175. If the points when the losing discard was made were above 16000, cheat points of 16 are set, assuming that an unauthorized operation was conducted (at least one of the communication cable 8 and the power supply line 9 was pulled out from the outlet 7) and added to the points given in Step ST175. Accordingly, 32 cheat points are set when the rank was in the fourth place and the points when the losing discard was made were above 16000. Various weighting modes can be thought for the points when the losing discard was made. For example, cheat points may be set only for the player in the lowest rank or inferior players (here, third and fourth places).

The monitoring section 361g reads the data of the same player as the owner of the log data from the cheater information storage 362e, and the cheat points calculated this time and a cheat count of 1 are added to the cheater information of this player to update the data of this player in the cheater information storage 362e. In the case of a player to whom the log data is issued for the first time, no data is present in the cheater information storage 362e for this player. Thus, new data are generated and written. The cheat points are set according to the rank and the points when the losing discard was made, but may be set according to either one of them or other element(s) may also be considered for the setting.

Figure 20:
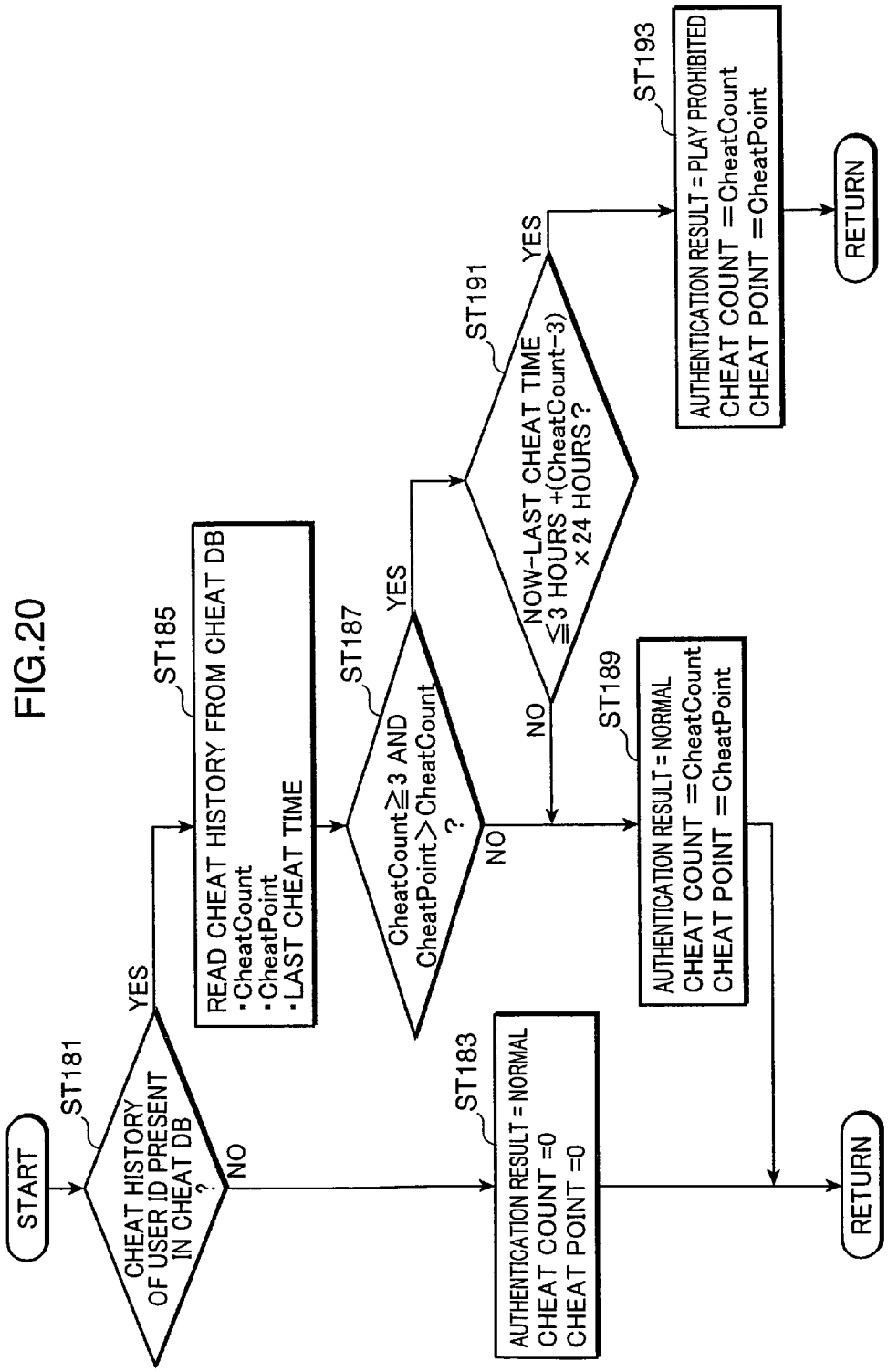
FIG. 20 is an exemplary flow chart of a cheater confirmation process performed as a part of a user authentication process.
Figure 21:
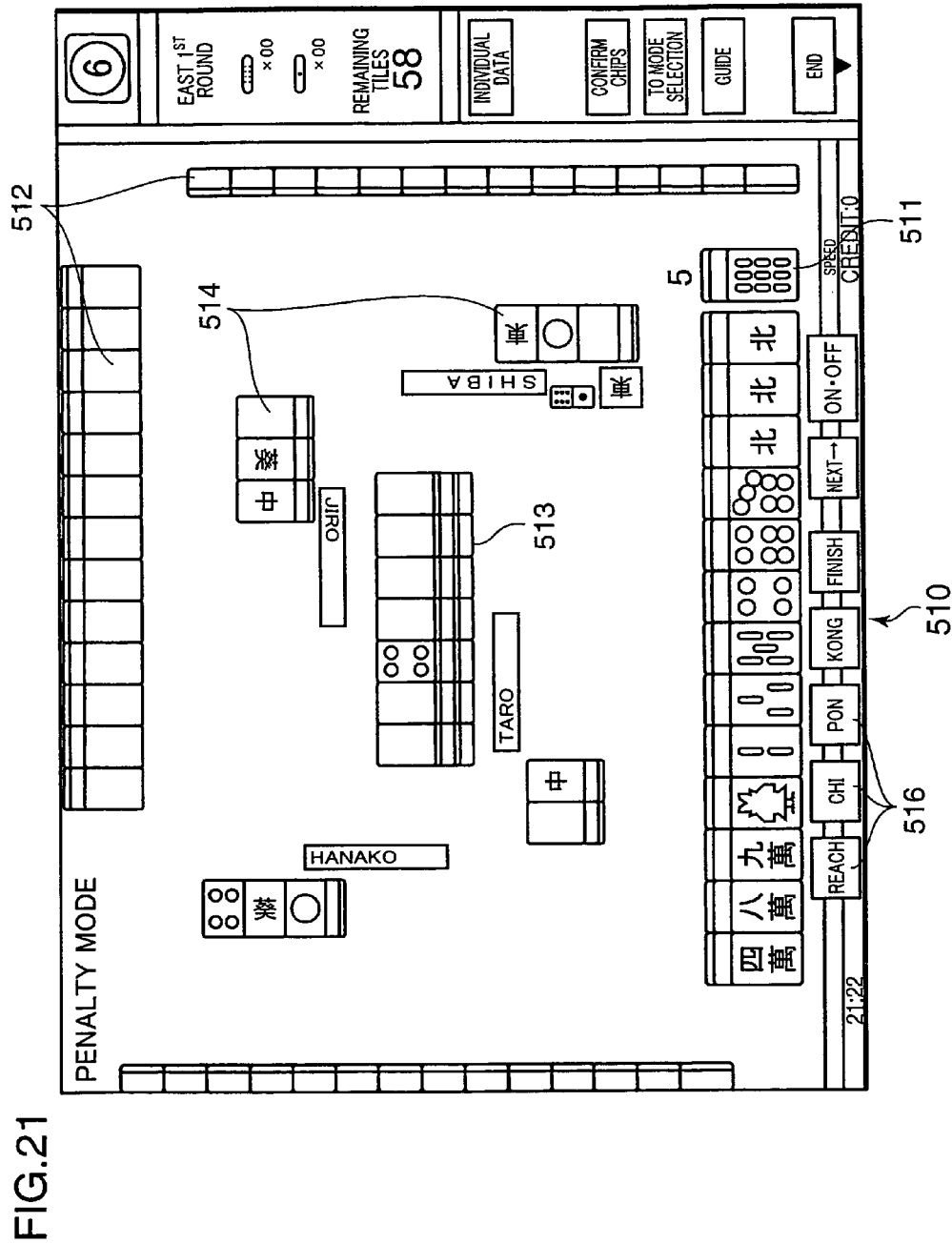
FIG. 21 is a diagram showing an exemplary competition screen by cheaters.

FIG. 20 is an exemplary flow chart of a cheater confirmation process performed as a part of the user authentication process. This flow is started when the individual information of the player wishing to participate in the game is received from the client terminal device 1. It is judged whether or not there is any cheat history corresponding to the user ID data authenticated in the player authentication process in the cheater information storage 362e (cheat DB) (Step ST181). In the absence of the cheat history, this routine returns with the cheat count and the cheat point set to 0 (Step ST183), assuming that an authentication result indicates an honest player. On the other hand, if the cheat history is present, cheat information, i.e. the cheat count, the cheat points and the time of the last cheating were read from the cheater information storage 362e (Step ST185). Then, it is judged whether or not the cheat history has exceeded a specified threshold value, here, whether or not the cheat count is equal or above a specified number, e.g. 3 and an average cheat point as one kind of cheat parameters is equal to or above a specified value, e.g. 1 (Step ST187). The average cheat point as one kind of cheat parameters is calculated by (cheat points)/(cheat count). That the average cheat point exceeding 1 can be judged to be a high possibility of an unauthorized operation. If this judgment result is negative, the player is judged to be normal in the authentication result, assuming a small intension of cheating, and the participation in the game is permitted after a cheater level comprised of the cheat count and the cheat points is set (Step ST189). On the other hand, if the judgment result is affirmative, it is judged whether or not (present time–last cheat time) is equal to or shorter than {3 hours+(cheat count–3)×24 hours} (Step ST191). For example, if the cheat count is 5 and 51 hours have not elapsed yet from the last cheat time, the above judgment result is negative. This is because restriction is moderated with respect to time to give a so-called improvement chance to clean up one's act in consideration of the cheat count for a player whose has not cheated for a long time after the last unauthorized operation. If this judgment result is negative, a high possibility of improvement is assumed and the player is judged to be normal in the authentication result and permitted to participate in the game (Step ST189). In the competition game in Step ST189, a specified title notifying a competition by cheaters, e.g. "PENALTY MODE" is displayed at a specified position of the competition screen as shown in FIG. 21.

On the other hand, if the above judgment result is affirmative, a process of prohibiting the participation of the player in the game is performed, identifying the player as a habitual cheater (Step ST193). As the process of prohibiting the participation of the player in the game, a message of "play prohibition" is, for example, displayed on the monitor 11 of the client terminal device 1.

By the process of FIG. 20, the process of judging the cheater levels in Step ST75 of FIG. 14 is made possible. Specifically, in Step ST75 of FIG. 14, the players having the same cheater level are caused to play the competition game with restriction placed on the competition with honest players. Thus, a possibility that honest players suffer inconveniences from unauthorized operations can be maximally prevented. For example, players having the same cheater level or similar cheater levels can be caused to compete, utilizing a degree of malice as one kind of the cheat parameters. In this case, an indication or warning to the effect that this competition game is played only by cheaters can be individually displayed at suitable positions of the selection screens of the competitors as shown in FIG. 21 or at suitable positions of game screens during the game, thereby suppressing unauthorized operations.

The cheater level is one kind of the cheat parameters and may be calculated as the average cheat point, which is the ratio of the cheat points to the cheat count. Further, a degree of malice calculated by the following equation may be used as a cheat parameter.

Degree of malice=INT((cheat points/cheat count)/4)

For example, if the cheat points are 28 and the cheat count is 5, the degree of malice is 1 by the above equation.

The present invention may be embodied as follows.

(A) Although the game executed by the client terminal devices 1 is a mahjong game in this embodiment, it may be another game played by a plurality of players. For example, it may be a card game, a go game, a shogi game, a shooting game, a racing game or the like.

(B) Although the shop servers 2 are provided in this embodiment, the client terminal devices 1 may be connected to the central server 3 via the network.

(C) Although coins are inserted into the coin receiver 15 at the time of continuing the game in this embodiment, the present invention is not limited thereto. For example, a card may be received instead of the coins.

(D) The construction of this embodiment connecting the central server 3, the shop servers 2 and the client terminal devices 1 is not limited to the one shown in FIG. 1. For example, without using the shop servers 2, the client terminal devices 1 and the central server 3 can be thought to be connected in various modes including a ring type, a tree type, a star type and the like. In this case, the tree type connection mode is preferable. By letting the client terminal devices 1 have the functions of the central server 3, one of the client terminal devices 1 as a host terminal device and the other client terminal devices 1 may be connected. Further, the shop servers 2 having the functions of the central server 3 may be connected to the client terminal devices 1 in the corresponding shops. Preferably, the shop servers 2 are provided between the central server 3 and the client terminal devices 1 and the central server 3, the shop servers 2 and the client terminal devices 1 are let to perform distributed processings as shown in FIG. 1. In this case, it is preferable to install the shop servers 2 in a one-to-one correspondence with the respective shops and to connect the client terminal devices 1 to the shop servers.

(E) Although the participation in the competition game is prohibited according to the cheater levels as a penalty to cheaters in the above embodiment, the participation in the game may be prohibited only for a specified period to a player who conducted an unauthorized operation.

(F) Besides the prohibition of the participation in the game, point assignment may be restricted, fewer points may be assigned or all or some of the points may be forfeited as a penalty to cheaters. Besides the points, item assignment may be restricted, fewer items may be assigned or all or some of the items may be forfeited. Further, the rank may be demoted or the title may be withdrawn or a specified handicap (e.g. reduction in the points of the chips) may be given for a competition game. These processes also lead to the suppression of unauthorized operations.

(G) The identification elements as a cheater are not limited to the rank and the points when a losing discard was made, and an element such as the place in the overall ranking may also be considered. In other types of games, it is possible to suitably adopt elements disadvantageous to players in view of the characteristics of these games. For example, in the case of a racing game, disadvantageous elements are thought to be goal finishing by another player or excess of a specified time. In these cases as well, an unauthorized end can be maximally prevented in the case where a game result disadvantageous to the player is expected. Cases where a game result disadvantageous to the player is expected are thought to be a case where the player is inferior to competing players and a case where the player is in a worse position than competing players in the middle of the game.

A game management method capable of executing a competition game among a plurality of game terminal devices by exchanging operation information with each other via a network as described above comprises a player identification step of identifying players before the start of the game, an unusual end judging step of judging that the game in process has been ended in an unusual manner, an unauthorized end judging step of judging whether or not the unusual end is an unauthorized end of the game due to an unauthorized operation by the player, and a cheat parameter calculating step of calculating a cheat parameter used to judge whether or not a specified penalty is to be given to the player having ended the game in an unauthorized manner.

Further, a game management system capable of executing a competition game among a plurality of game terminal devices by exchanging operation information with each other via a network comprises player identification means for identifying players before the start of the game; unusual end judging means for judging that the game in process has been ended in an unusual manner; unauthorized end judging means for judging whether or not the unusual end is an unauthorized end of the game due to an unauthorized operation by the player; and cheat parameter calculating means for calculating a cheat parameter used to judge whether or not a specified penalty is to be given to the player having ended the game in an unauthorized manner.

Furthermore, a game terminal device capable of executing a competition game by exchanging operation information via a network comprises player identification means for identifying a player before the start of the game; unusual end judging means for judging that the game in process has been ended in an unusual manner; unauthorized end judging means for judging whether or not the unusual end is an unauthorized end of the game due to an unauthorized operation by the player; and cheat parameter calculating means for calculating a cheat parameter used to judge whether or not a specified penalty is to be given to the player having ended the game in an unauthorized manner.

According to these constructions, if the players perform game operations in the respective plurality of game terminal devices, pieces of operation information are exchanged with each other via the network and the competition game is executed among the plurality of game terminal devices. The players are identified before the start of the game in the player identification step. If it is judged in the unusual end judging step that the game in process was ended in an unusual manner, it is judged in the unusual end judging step whether or not the unusual end is the unauthorized end of the game due to the unauthorized operation of the player and it is judged in the cheat parameter calculating step whether or not the specified penalty is to be given to the player having ended the game in an unauthorized manner. Accordingly, unauthorized operations of players can be suppressed and fairness can be maintained among honest players by judging with high accuracy whether or not the unusual end of the game was caused by the unauthorized operation of the player.

It is preferable that the unauthorized end judging step includes a step of setting cheat points based on a status of the competition game of the game terminal device operated by the player at the time of the unusual end; and the cheat parameter calculating step includes a step of accumulating the number of unusual ends, a step of adding the set cheat points to those Immediately before, and a step of calculating the cheat parameter from a ratio of the accumulated cheat points to the accumulated number of unusual ends. According to this construction, the cheat points are set based on the status of the competition game of the game terminal device operated by the player at the time of the unusual end, and the cheat parameter is calculated from the ratio of the accumulated cheat points to the accumulated number of unusual ends by executing the step of accumulating the number of unusual ends and the step of adding the set cheat points to those immediately before. In this way, unauthorized operations can be monitored with high probability.

The step of setting the cheat points is preferably performed based on the case where the player is inferior to the competing players in the competition game. Further, the step of setting the cheat points is preferably performed based on the case where the result of the competition game is worse than those of the competing players. According to these constructions, unauthorized operations can be monitored with high probability.

The step of setting the cheat points is preferably performed to assign cheat points that differ depending on the status of the competition game. According to this construction, cheating can be evaluated according to a degree of cheating, e.g. a cheat count and the status at the time of cheating.

Further, it is preferable to further comprise a penalty judging step of judging whether or not the cheat parameter has reached a threshold value as a criterion of the specified penalty. According to this construction, the penalty is given if the cheat parameter exceeds the threshold value, which leads to the suppression of unauthorized operations.

Furthermore, it is preferable to further comprise a penalty processing step of performing a specified penalty process if the player identified in the player identification step is a player judged to receive the specified penalty in the penalty judging step. According to this construction, the penalty is given to the player whose cheat parameter exceeded the threshold value, which leads to the suppression of unauthorized operations.

Further, the penalty processing step is preferably performed to give a specified handicap for the competition game. Alternatively, the penalty processing step is preferably performed to give a specified warning upon executing the competition game. According to these constructions, unauthorized operations are suppressed.

Furthermore, the penalty processing step is preferably performed to prohibit the execution of the competition game. According to this construction, unauthorized operations are suppressed and fairness is maintained among honest players.

Industrial Applicability

The present invention can suppress unauthorized operations of players and maintain fairness among honest players by judging whether or not an unusual end is an unauthorized end of a game due to an unauthorized operation by a player if the game in process was ended in an unusual manner and judging whether or not a penalty is to be given to the player having ended the game in an unauthorized manner.

What is claimed is:

1. A game management method capable of executing a competition game among a plurality of game terminal devices by exchanging operation information with each other via a network, comprising:
   a player identification step of identifying players before the start of the game;
   a cheat parameter calculating step of calculating a cheat parameter used to judge whether or not a specified penalty is to be given to a player;
   an unusual end judging step of judging whether or not an end of the game in process is an unusual end; and
   an unauthorized end judging step of judging whether or not the unusual end is an unauthorized end of the game due to an unauthorized operation by the player;
   wherein the unauthorized end judging step includes a step of setting cheat points based on a status of the competition game of the game terminal device operated by the player at the time of the unusual end, and
   wherein the cheat parameter calculating step includes a step of accumulating the number of unusual ends, a step of adding the set cheat points to those immediately before, and a step of calculating the cheat parameter from a ratio of the accumulated cheat points to the accumulated number of unusual ends.

2. The game management method according to claim 1, wherein the step of setting the cheat points is performed based on the case where the player is inferior to the competing players in the competition game.

3. The game management method according to claim 1, wherein the step of setting the cheat points is performed based on the case where the result of the competition game is worse than those of the competing players.

4. The game management method according to claim 1 wherein the step of setting the cheat points is performed to assign cheat points that differ depending on the status of the competition game.

5. The game management method according to claim 1, further comprising a penalty judging step of judging whether or not the cheat parameter has reached a threshold value as a criterion of the specified penalty.

6. The game management method according to claim 5, further comprising a penalty processing step of performing a specified penalty process if the player identified in the player identification step is a player judged to receive the specified penalty in the penalty judging step.

7. The game management method according to claim 6, wherein the penalty processing step is performed to give a specified handicap for the competition game.

8. The game management method according to claim 6, wherein the penalty processing step is performed to give a specified warning upon executing the competition game.

9. The game management method according to claim 6, wherein the penalty processing step is performed to prohibit the execution of the competition game.

10. The game management method according to claim 1, further comprising:
   a cheat history information storing step of generating and storing cheat history information of the player having ended the game in the unauthorized manner; and
   restricting competition in the competition game via the network so that players having a same cheater level compete and are restricted from competing against honest players.

11. The game management method according to claim 10, further comprising an unusual end judging step of judging that the game in process has been ended in an unusual manner, wherein:
   the unauthorized end judging step includes a step of judging whether or not the unusual end is an unauthorized end of the game caused by an unauthorized operation by the player,
   the cheat history information storing step includes a step of calculating a cheat parameter used to judge whether or not a specified penalty is to be given to the player having ended the game in the unauthorized manner.

12. The game management method according to claim 10, further comprising a decreasing step of updating the cheat history information of each identified player in such a manner as to decrease a degree of cheating every time a competition game is executed without any unauthorized end.

13. A game management system capable of executing a competition game among a plurality of game terminal devices by exchanging operation information with each other via a network, comprising:
   player identification means for identifying players before the start of the game;
   cheat parameter calculating means for calculating a cheat parameter used to judge whether or not a specified penalty is to be given to a player having ended the game in an unauthorized manner;
   means for judging whether or not the end of the game in process is an unusual end, wherein the judging means comprises: means for setting cheat points based on a status of the competition game of the game terminal device operated by the player at the time of the unusual end; and
   unauthorized end judging means for judging whether or not the unusual end is an unauthorized end of the game due to an unauthorized operation by the player; and
   wherein the cheat parameter calculating means comprises means for accumulating the number of unusual ends, means for adding the set cheat points to those immediately before, and means for calculating the cheat parameter from a ratio of the accumulated cheat points to the accumulated number of unusual ends.

14. The game management system according to claim 13, further comprising:
   combination setting means for setting a combination of the competition game via the network, and
   cheat history information storing means for generating and storing cheat history information of the player having ended the game in an unauthorized manner;
   wherein the combination setting means reads the cheat history information of each identified player and combines the players having cheat histories.

15. A game terminal device capable of executing a competition game by exchanging operation information via a network, comprising:
   player identification means for identifying a player before the start of the game;
   cheat parameter calculating means for calculating a cheat parameter used to judge whether or not a specified penalty is to be given to the player having ended the game in an unauthorized manner; and
   means for judging whether or not the end of the game in process is an unusual end, wherein the judging means comprises: means for setting cheat points based on a status of the competition game of the game terminal device operated by the player at the time of the unusual end; and unauthorized end judging means for judging whether or not the unusual end is an unauthorized end of the game due to an unauthorized operation by the player; and wherein the cheat parameter calculating means comprises means for accumulating the number of unusual ends, means for adding the set cheat points to those immediately before, and means for calculating the cheat parameter from a ratio of the accumulated cheat points to the accumulated number of unusual ends.

16. The game terminal device according to claim 15, further comprising cheat parameter calculating means for calculating a cheat parameter used to judge whether or not a specified penalty is to be given to the player having ended the game in an unauthorized manner.

17. The game terminal device according to claim 15, further comprising:

combination setting means for setting a combination of the competition game via the network, and cheat history information storing means for generating and storing cheat history information of the player having ended the game in an unauthorized manner;

wherein the combination setting means reads the cheat history information of each identified players and combines the players having cheat histories, so that players having a same cheater level compete and are restricted from competing against honest players.

18. The method of claim 1, wherein said player ends that player's participation in the game;

wherein said cheat parameter calculating step calculates the cheat parameter used to judge whether or not the specified penalty is to be given to the player having ended that player's participation;

wherein said unusual send judging step comprises judging whether or not said participation end is an unusual end; and wherein said unauthorized end judging step comprises judging whether or not the participation end is an unauthorized end; and further comprising:

substituting a CPU player for the player having ended participation in the game to allow continuation of the game using simulated operation information.

19. The game management system of claim 13, wherein the cheat parameter calculating means calculates the cheat parameter used to judge whether or not the specified penalty is to be given to the player that ended participation in the game in an unauthorized manner;

wherein the unusual end judging means judges whether or not the participation end is an unusual end; and wherein the unauthorized end judging means judges whether or not the unusual end is an unauthorized end of participation due to an unauthorized operation by the player; and further comprising:

means for substituting a CPU player for the player having ended participation in the game to allow continuation of the game using simulated operation information.

20. The game terminal device of claim 15, wherein the cheat parameter calculating means calculates the cheat parameter used to judge whether or not the specified penalty is to be given to the player that ended participation in the game in an unauthorized manner;

wherein the unusual end judging means judges whether or not the participation end is an unusual end; and wherein the unauthorized end judging means judges whether or not the unusual end is an unauthorized end of participation due to an unauthorized operation by the player; and further comprising:

means for substituting a CPU player for the player having ended participation in the game to allow continuation of the game using simulated operation information.

21. A game management method capable of executing a competition game among a plurality of game terminal devices by exchanging operation information with each other via a network, comprising:

a player identification step of identifying players before the start of the game;

a cheat parameter calculating step of calculating a cheat parameter used to judge whether or not a specified penalty is to be given to a player;

an unusual end of participation judging step of judging whether or not a player is detected as having ended participation prior to end of the game;

an unauthorized end judging step of judging whether or not the unusual end of participation is an unauthorized end of participation due to an unauthorized operation by the player; and continuing the game with remaining players by substituting a CPU player using simulated operation information in place of the player detected as having ended participation;

wherein the unauthorized end judging step includes a step of setting cheat points based on a status of the competition game of the game terminal device operated by the player at the time of the unusual end; and wherein the cheat parameter calculating step includes a step of accumulating the number of unusual ends, a step of adding the set cheat points to those immediately before, and a step of calculating the cheat parameter from a ratio of the accumulated cheat points to the accumulated number of unusual ends.

* * * * *